(12) United States Patent
Thorne et al.

(10) Patent No.: US 8,894,091 B2
(45) Date of Patent: Nov. 25, 2014

(54) STROLLER WITH FRAME POSITION SENSOR

(75) Inventors: Henry F. Thorne, West View, PA (US); Robert D. Daley, Pittsburgh, PA (US); Mary J. Koes, Pittsburgh, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 582 days.

(21) Appl. No.: 13/109,171

(22) Filed: May 17, 2011

(65) Prior Publication Data
US 2011/0248840 A1 Oct. 13, 2011

Related U.S. Application Data

(63) Continuation of application No. 12/032,370, filed on Feb. 15, 2008, now abandoned.

(60) Provisional application No. 60/890,597, filed on Feb. 19, 2007, provisional application No. 60/890,601, filed on Feb. 19, 2007, provisional application No. 60/890,605, filed on Feb. 19, 2007, provisional application No. 60/890,607, filed on Feb. 19, 2007, provisional application No. 60/890,608, filed on Feb. 19, 2007, provisional application No. 60/890,613, filed on Feb. 19, 2007, provisional application No. 60/890,616, filed on Feb. 19, 2007, provisional application No. 60/890,618, filed on Feb. 19, 2007, provisional application No. 60/890,619, filed on Feb. 19, 2007, provisional application No. 60/890,624, filed on Feb. 20, 2007.

(51) Int. Cl.
*B62B 9/24* (2006.01)
*B62B 7/10* (2006.01)
*B62B 7/08* (2006.01)
*B62B 7/06* (2006.01)
*B62B 9/10* (2006.01)

(52) U.S. Cl.
CPC . *B62B 7/083* (2013.01); *B62B 9/24* (2013.01); *B62B 7/08* (2013.01); *B62B 2205/18* (2013.01); *B62B 2205/12* (2013.01); *B62B 2205/003* (2013.01); *B62B 7/068* (2013.01); *B62B 9/10* (2013.01)
USPC .......................................... 280/650; 280/658

(58) Field of Classification Search
CPC .......... B62B 7/08; B62B 7/083; B62B 7/068; B62B 9/10; B62B 9/24; B62B 2205/003
USPC ......... 280/642, 643, 647, 648, 650, 657, 658; 340/573.1
See application file for complete search history.

(56) References Cited

U.S. PATENT DOCUMENTS 2,669,460 A 2/1954 Wallner
2,914,111 A 11/1959 Mize
(Continued)

FOREIGN PATENT DOCUMENTS

CN 201023514 Y 2/2008
DE 4328567 A1 3/1995
(Continued)

*Primary Examiner* — Frank Vanaman
(74) *Attorney, Agent, or Firm* — The Webb Law Firm

(57) ABSTRACT

A stroller includes: a first stroller component; a second stroller component comprising a child receiving portion; a drive mechanism operatively engaged with at least one of the first and second stroller components to move the at least one of the first and second stroller components from a first position to a second position; and an object sensor operably coupled to the child receiving portion. The object sensor provides a signal that prevents movement of the first and second stroller components from the first position to the second position if the object sensor detects the presence of an object in the child receiving portion.

17 Claims, 25 Drawing Sheets

(56) References Cited

U.S. PATENT DOCUMENTS

| | | | |
|---|---|---|---|
| 3,961,803 A | 6/1976 | Fleischer | |
| 4,527,665 A | 7/1985 | Shamie | |
| 4,567,964 A | 2/1986 | Kassai | |
| 4,618,033 A | 10/1986 | Kassai | |
| 4,620,711 A | 11/1986 | Dick | |
| 4,671,299 A * | 6/1987 | Okumoto et al. | 131/60 |
| 4,710,689 A * | 12/1987 | Uetsuki et al. | 318/630 |
| 4,831,689 A | 5/1989 | Lo | |
| 4,896,894 A * | 1/1990 | Singletary | 280/30 |
| 4,913,452 A | 4/1990 | Zun | |
| 4,953,667 A | 9/1990 | Bigo | |
| 4,985,960 A | 1/1991 | Zun | |
| 4,997,066 A | 3/1991 | Bigo | |
| 5,188,389 A | 2/1993 | Baechler et al. | |
| 5,366,036 A | 11/1994 | Perry | |
| 5,373,917 A | 12/1994 | Kamman | |
| 5,409,277 A * | 4/1995 | Rogers et al. | 292/336.3 |
| 5,460,399 A | 10/1995 | Baechler et al. | |
| 5,522,614 A | 6/1996 | Eyman et al. | |
| 5,531,637 A * | 7/1996 | Kimura | 451/329 |
| 5,581,939 A * | 12/1996 | Regan et al. | 49/139 |
| 5,584,561 A | 12/1996 | Lahos | |
| 5,590,896 A | 1/1997 | Eichhorn | |
| 5,707,272 A * | 1/1998 | Hashimoto et al. | 451/41 |
| 5,765,665 A | 6/1998 | Cheng et al. | |
| 5,911,478 A | 6/1999 | Goodman | |
| 5,967,535 A | 10/1999 | King | |
| 6,022,042 A | 2/2000 | Hartenstine | |
| 6,062,587 A | 5/2000 | Cabagnero | |
| 6,102,167 A | 8/2000 | Chiu | |
| 6,155,628 A | 12/2000 | Williams | |
| 6,170,615 B1 | 1/2001 | Cheng | |
| 6,173,461 B1 | 1/2001 | Alexander | |
| 6,203,054 B1 | 3/2001 | Matsumoto | |
| 6,298,949 B1 | 10/2001 | Yang et al. | |
| 6,308,805 B1 | 10/2001 | Lan | |
| 6,341,672 B1 | 1/2002 | Yang et al. | |
| 6,394,633 B1 | 5/2002 | Perez | |
| 6,408,990 B1 | 6/2002 | Chen | |
| 6,499,749 B2 | 12/2002 | Hsia | |
| 6,560,827 B1 | 5/2003 | Gross | |
| 6,598,712 B1 | 7/2003 | Sun | |
| 6,663,121 B2 | 12/2003 | Santos et al. | |
| 6,676,140 B1 | 1/2004 | Gondobintoro | |
| 6,722,690 B2 | 4/2004 | Lan | |
| 6,725,713 B2 | 4/2004 | Adamson et al. | |
| 6,742,791 B2 | 6/2004 | Lan | |
| 6,807,853 B2 | 10/2004 | Adamson et al. | |
| 6,877,760 B2 | 4/2005 | Wang | |
| 6,908,154 B2 | 6/2005 | Aono | |
| 6,926,287 B1 | 8/2005 | Maher | |
| D510,716 S | 10/2005 | Refsum et al. | |
| 7,059,452 B2 | 6/2006 | Chen | |
| 7,077,420 B1 | 7/2006 | Santoski | |
| D526,601 S | 8/2006 | Oxseth | |
| 7,125,081 B2 | 10/2006 | Church et al. | |
| 7,128,076 B2 | 10/2006 | Freedman | |
| 7,175,004 B2 | 2/2007 | Kassai et al. | |
| 7,219,918 B2 | 5/2007 | Lan | |
| 7,222,874 B1 | 5/2007 | Liu | |
| 7,229,091 B2 | 6/2007 | Lan | |
| 7,289,035 B2 * | 10/2007 | Nathan et al. | 340/667 |
| 7,367,432 B2 | 5/2008 | Chen | |
| 7,374,196 B2 | 5/2008 | Hartenstine et al. | |
| 7,383,925 B2 | 6/2008 | Chen | |
| 7,445,228 B2 | 11/2008 | Henry | |
| D583,719 S | 12/2008 | Siewertsen | |
| 7,523,954 B2 | 4/2009 | Dotsey et al. | |
| 7,571,926 B2 | 8/2009 | Huang | |
| 7,591,479 B2 | 9/2009 | Golias | |
| 7,832,755 B2 | 11/2010 | Nolan et al. | |
| 2003/0025300 A1 | 2/2003 | Maxisch | |
| 2003/0132612 A1 | 7/2003 | Pike et al. | |
| 2004/0178025 A1 | 9/2004 | Zweideck | |
| 2005/0242548 A1 | 11/2005 | Hutchinson et al. | |
| 2005/0248121 A1 | 11/2005 | Ford | |
| 2006/0007191 A1 | 1/2006 | Chi et al. | |
| 2006/0151259 A1 | 7/2006 | Tomasi et al. | |
| 2006/0158868 A1 | 7/2006 | Palmer et al. | |
| 2006/0214395 A1 | 9/2006 | Ageneau | |
| 2006/0214397 A1 | 9/2006 | Dotsey et al. | |
| 2006/0249320 A1 | 11/2006 | Carter et al. | |
| 2006/0255566 A1 | 11/2006 | Dotsey et al. | |
| 2006/0255567 A1 | 11/2006 | Dotsey et al. | |
| 2006/0261576 A1 | 11/2006 | Dotsey et al. | |
| 2007/0045055 A1 | 3/2007 | Lan | |
| 2007/0051565 A1 | 3/2007 | Chen | |
| 2007/0085304 A1 | 4/2007 | Yeh | |
| 2007/0126208 A1 | 6/2007 | Freedman | |
| 2007/0222188 A1 | 9/2007 | Dean et al. | |
| 2007/0246915 A1 | 10/2007 | Madigan et al. | |
| 2007/0246916 A1 | 10/2007 | Hou | |
| 2007/0257457 A1 | 11/2007 | Dotsey et al. | |
| 2007/0262565 A1 | 11/2007 | Bearup et al. | |
| 2008/0000732 A1 | 1/2008 | Chen et al. | |
| 2008/0073878 A1 | 3/2008 | Li | |
| 2008/0078630 A1 | 4/2008 | Yeh | |
| 2008/0185236 A1 | 8/2008 | Chen et al. | |
| 2008/0185821 A1 | 8/2008 | Chen et al. | |
| 2008/0217115 A1 | 9/2008 | Chen | |
| 2008/0224450 A1 | 9/2008 | Van der Vegt | |
| 2008/0238042 A1 | 10/2008 | Chen et al. | |
| 2009/0014985 A1 | 1/2009 | Huang | |

FOREIGN PATENT DOCUMENTS

| | | |
|---|---|---|
| DE | 102005063362 A1 | 4/2007 |
| EP | 0633178 A1 | 1/1995 |
| EP | 0719693 A2 | 7/1996 |
| EP | 1270365 A1 | 1/2003 |
| EP | 1336545 A1 | 8/2003 |
| EP | 1459957 A1 | 9/2004 |
| EP | 1488983 A2 | 12/2004 |
| EP | 1582434 A2 | 10/2005 |
| EP | 1688336 A2 | 8/2006 |
| FR | 2794413 A3 | 12/2000 |
| GB | 2283791 A | 5/1995 |
| GB | 2293420 A | 3/1996 |
| GB | 2297133 A | 7/1996 |
| GB | 2351131 A | 12/2000 |
| GB | 2418894 A | 4/2006 |
| GB | 2430719 A | 4/2007 |
| GB | 2431622 A | 5/2007 |
| GB | 2431624 A | 5/2007 |
| GB | 2437300 A | 10/2007 |
| GB | 2446729 A | 8/2008 |
| GB | 2446900 A | 8/2008 |
| GB | 2448059 A | 10/2008 |
| JP | 2005263086 A | 9/2005 |
| JP | 2008296902 A | 12/2008 |
| WO | 2008085531 A1 | 7/2008 |

* cited by examiner

Handlebar position when stroller is fully open

As the stroller closes, the handlebars move closer together. The pin travels in the slot.

STROLLER WITH FRAME POSITION SENSOR

CROSS REFERENCE TO RELATED APPLICATIONS

This application is a continuation of U.S. patent application Ser. No. 12/032,370, which claims priority pursuant to 35 U.S.C. §119(e) to U.S. Provisional Application Nos. 60/890,597, filed Feb. 19, 2007; 60/890,601, filed Feb. 19, 2007; 60/890,605, filed Feb. 19, 2007; 60/890,607, filed Feb. 19, 2007; 60/890,608, filed Feb. 19, 2007; 60/890,613, filed Feb. 19, 2007; 60/890,616, filed Feb. 19, 2007; 60/890,618, filed Feb. 19, 2007; 60/890,619, filed Feb. 19, 2007; and 60/890,624, filed Feb. 20, 2007, which are all incorporated herein by reference in their entirety.

BACKGROUND OF THE INVENTION

1. Field of the Invention

The present invention relates generally to strollers, and more particularly pertains to baby strollers having one or more components which can be moved by a drive mechanism such as foldable baby strollers which may be moved between collapsed and operative positions automatically with little effort.

2. Description of Related Art

Baby strollers, also referred to as baby carriages, baby buggies or prams, have been used to hold and transport babies and young children for many years. Early baby strollers had parts which were fixedly secured to one another such that they did not fold for compactness. More recently, baby strollers have been designed to have some parts which are movable relative to one another to allow movement of some parts of the stroller to achieve a more compact configuration when not in use. However, current strollers do not allow for movement or folding to as compact of a configuration as desired, and are cumbersome and sometimes difficult to move between their collapsed (closed) position and their open (operative) positions, particularly when attending to a baby or child. A stroller which is easier to move between its collapsed and operative positions is desired.

SUMMARY OF THE INVENTION

In accordance with the present invention, various advantageous strollers are provided which allow one or more of their components to be moved easily and quickly between two or more positions. Described embodiments include a stroller with one or more first wheels, one or more first wheel support structures for supporting the one or more first wheels which are moveable from a collapsed position to an open position, with the stroller also having one or more second wheels, one or more second wheel support structures for supporting the one or more second wheels moveable from a collapsed to an open position, and one or more drive mechanisms operatively engaged with at least one of the one or more first wheel support structures and at least one of the one or more second wheel support structures to move the at least one of the one or more first wheel support structures from its collapsed to its open position, and the at least one of the one or more second wheel support structures from its collapsed to its open position.

In another described embodiment, a stroller is provided having a plurality of support members operatively connected with one another to define a linkage having one degree of freedom, with at least one of the support members engaging a wheel and being moveable between a collapsed position and an operative position, and having a drive operatively engaged with at least one of the plurality of support members, such that each of said plurality of support members are moveable between said collapsed and open positions by the drive, and having a control switch for actuation of the drive.

In another described embodiment, a stroller is provided having a guide rail having a longitudinal axis, one or more front wheels, a front wheel support structure for supporting the front one or more wheels, the front wheel support structure engaged with the guide rail for movement along the longitudinal axis of the guide rail, one or more rear wheels, and a rear wheel support structure for supporting the rear one or more wheels, with the rear wheel support structure engaged to the guide rail for movement along the guide rail longitudinal axis.

In another described embodiment, a stroller is provided having a first stroller component and a second stroller component, with at least one of the first and second stroller components being movable from a first position to a second position, and with a drive mechanism operatively engaged with the at least one of the first and second stroller components to move the at least one of the first and second stroller components from its first position to its second position, and a control switch operatively engaged with the drive mechanism to actuate the drive mechanism.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

DETAILED DESCRIPTION OF THE PRESENT INVENTION

Figure 1:
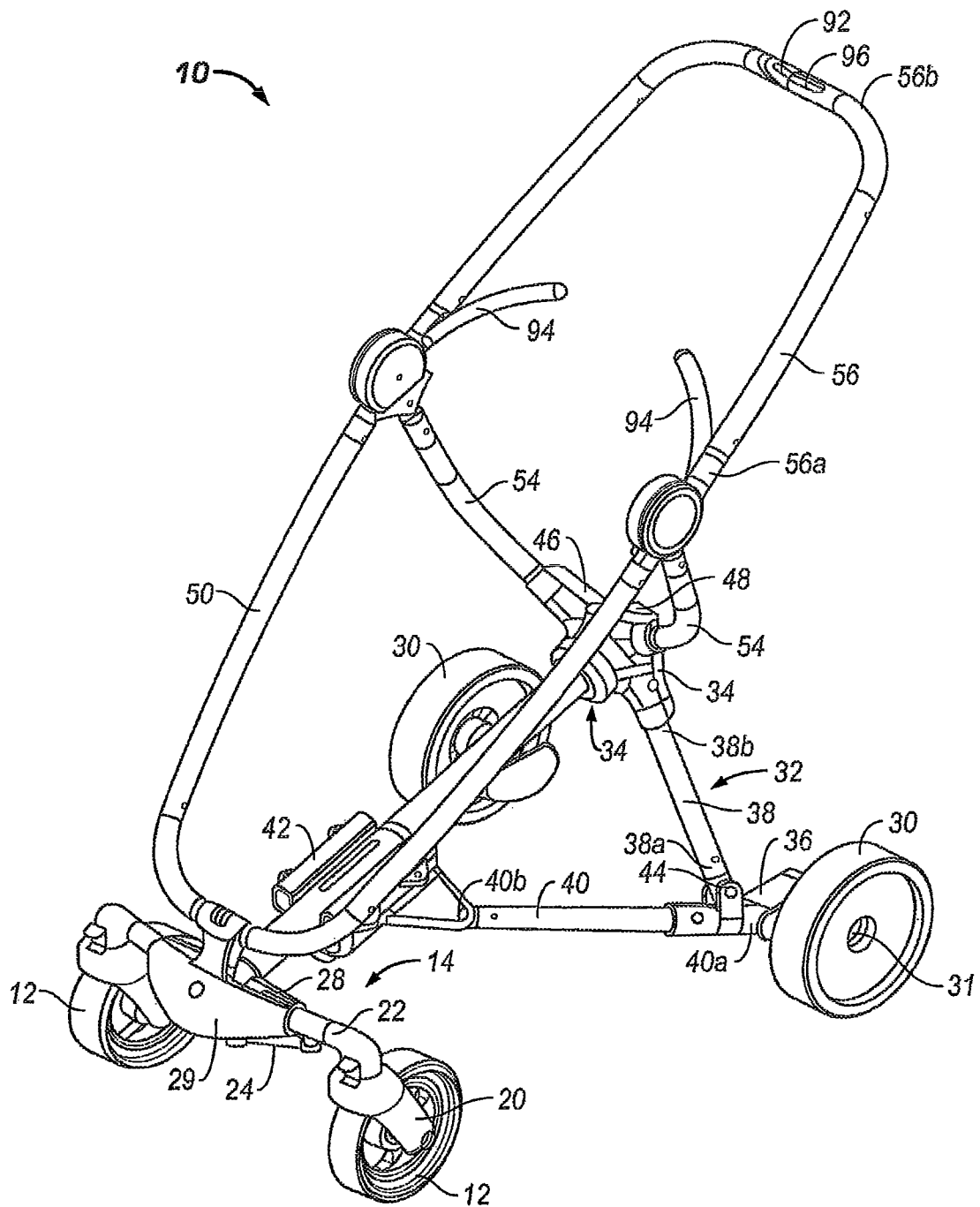
FIG. 1 is an isometric view of a stroller embodying various features of the present invention, with the illustrated stroller shown in its open position.
Figure 2:
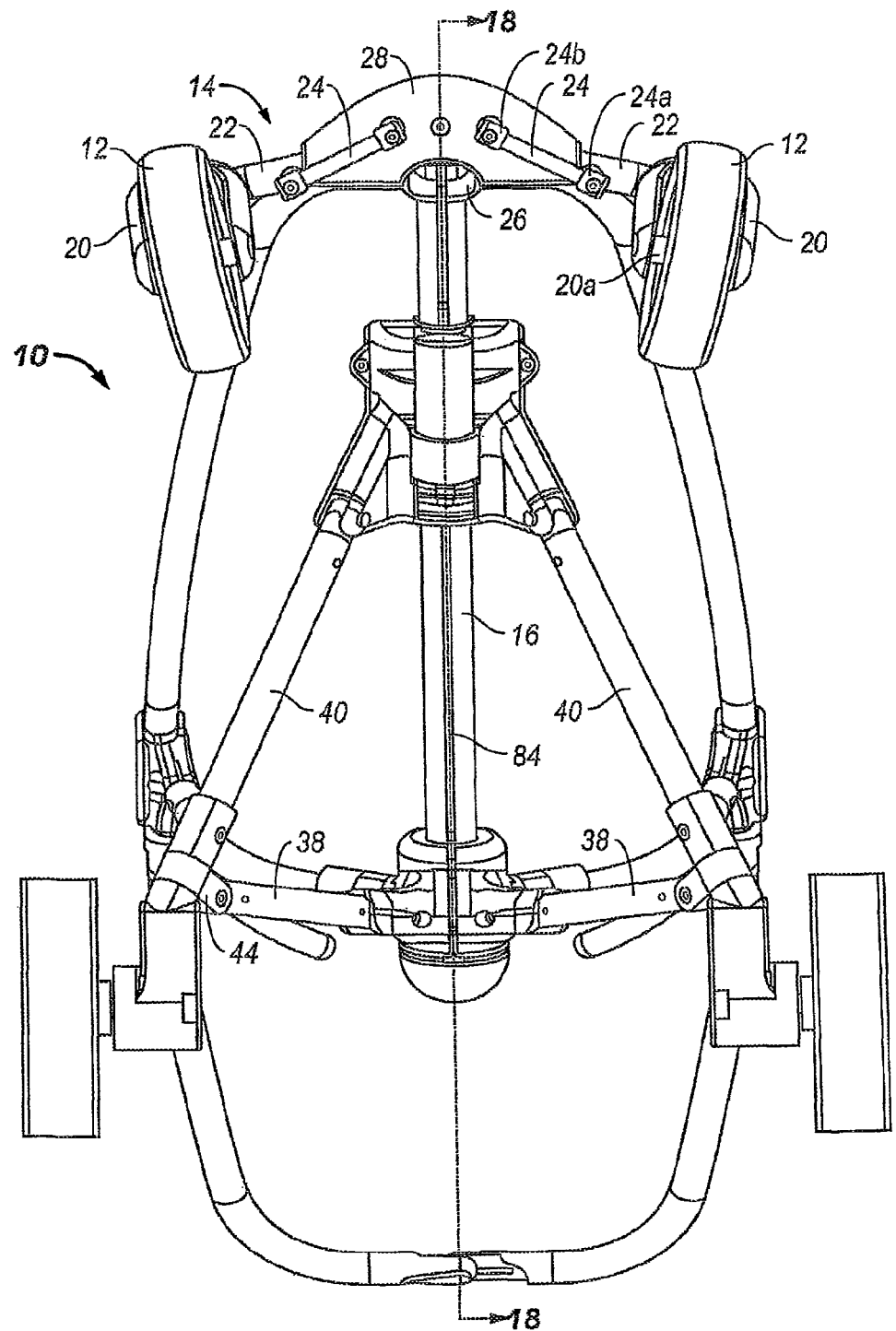
FIG. 2 is a bottom view of the stroller of FIG. 1 shown in its open position.
Figure 3:
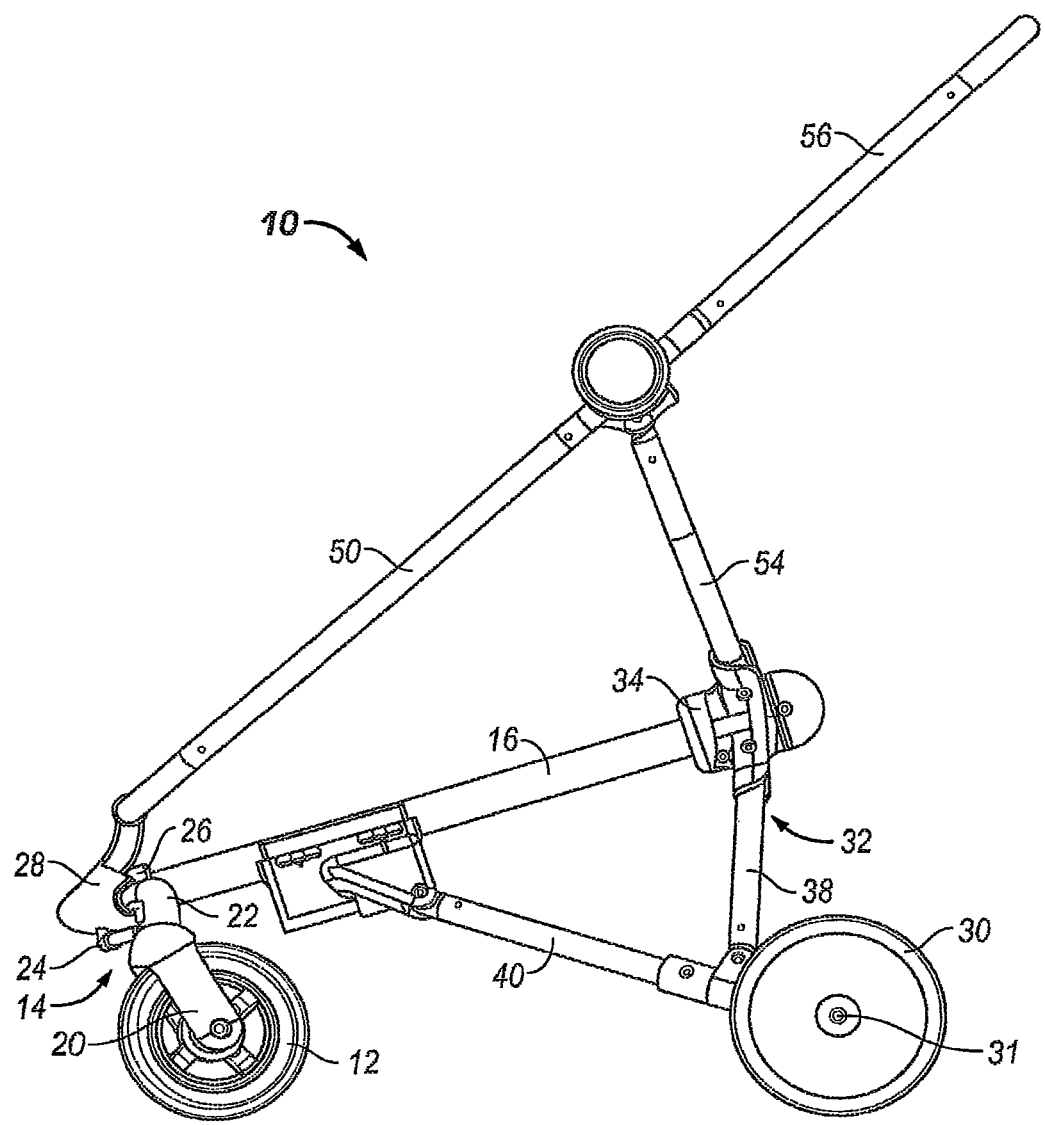
FIG. 3 is a side view of the stroller of FIG. 1 shown in its open position.
Figure 4:
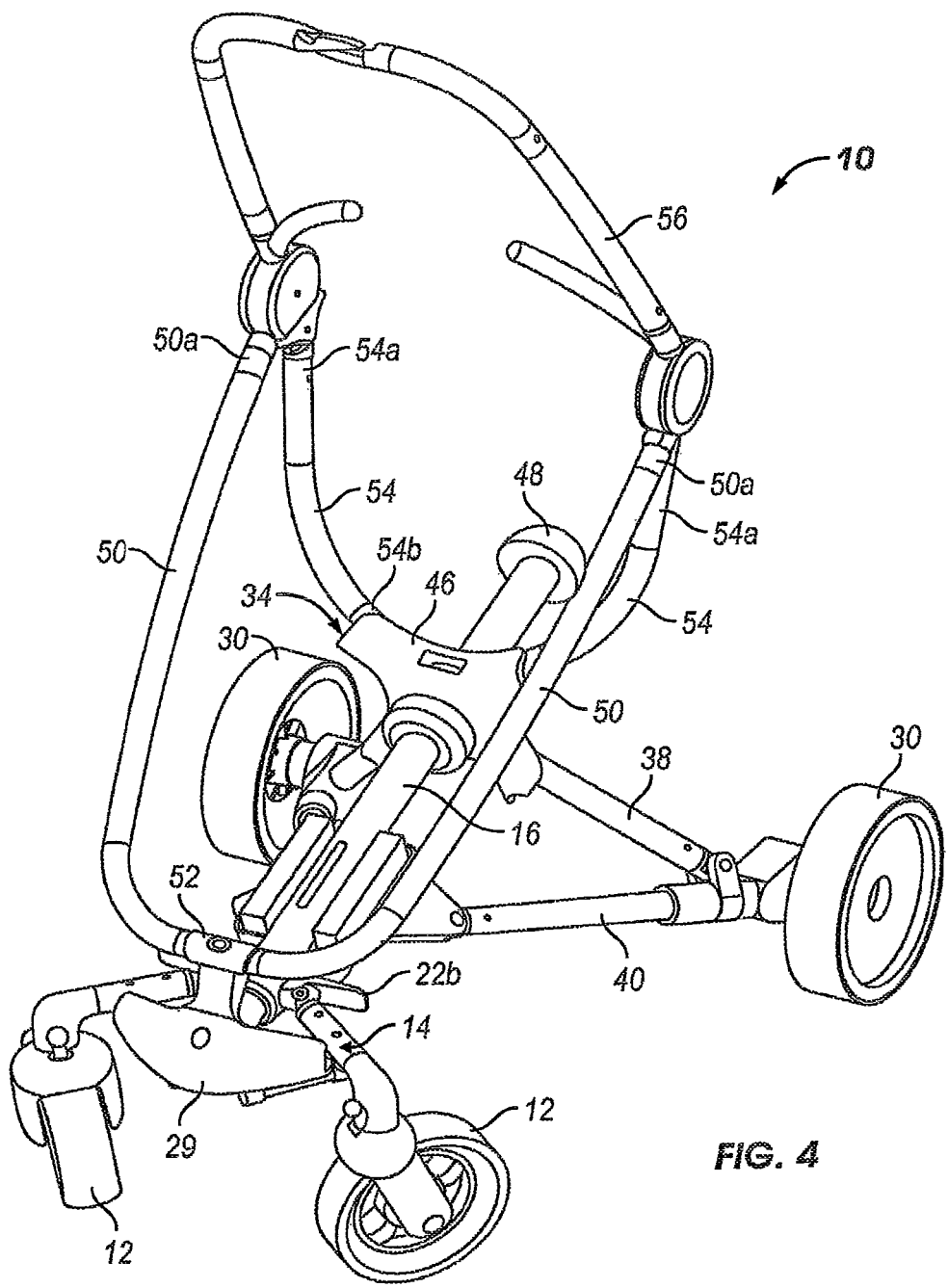
FIG. 4 is an isometric view of the stroller of FIG. 1 shown in its partially open position.
Figure 5:
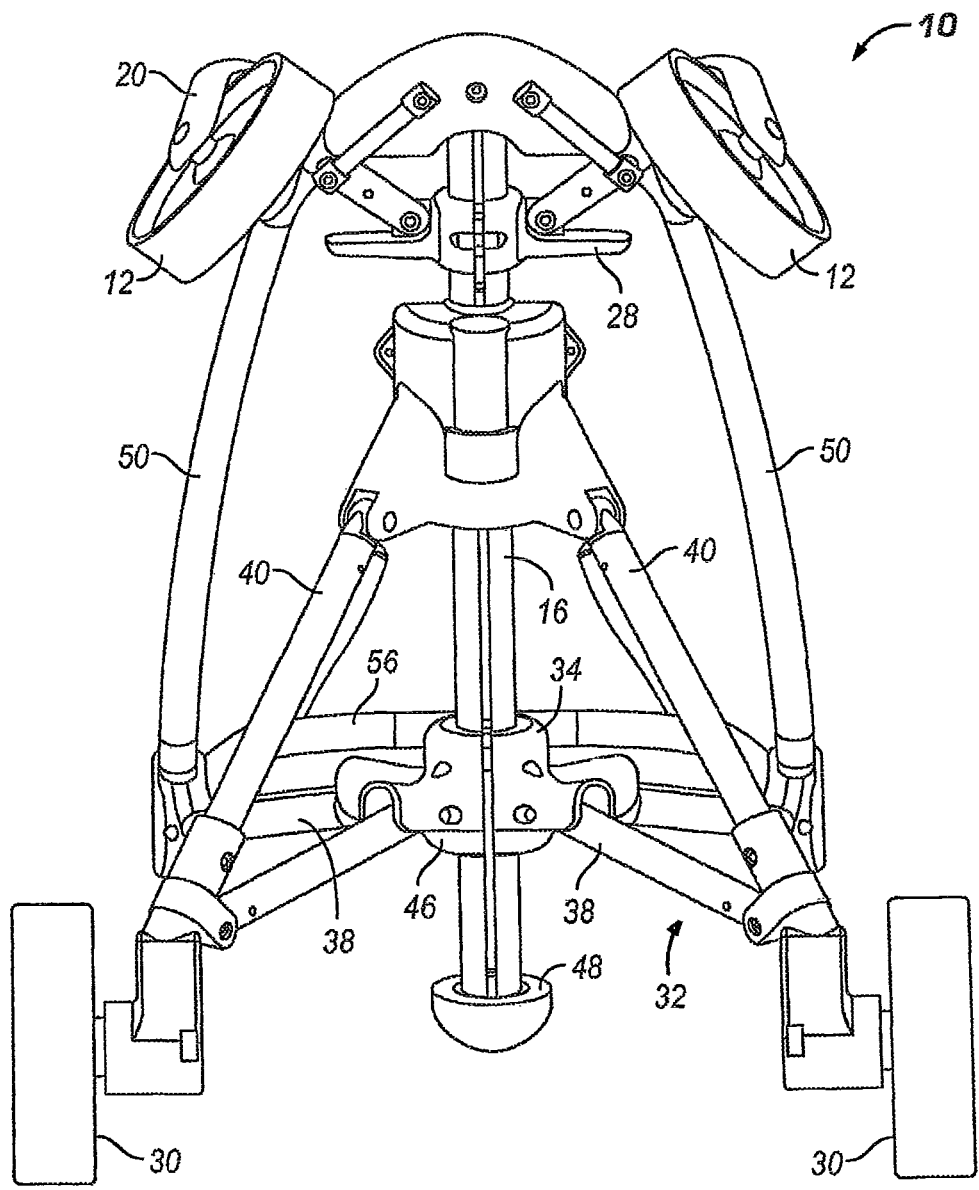
FIG. 5 is a bottom view of the stroller of FIG. 1 shown in its partially open position.
Figure 6:
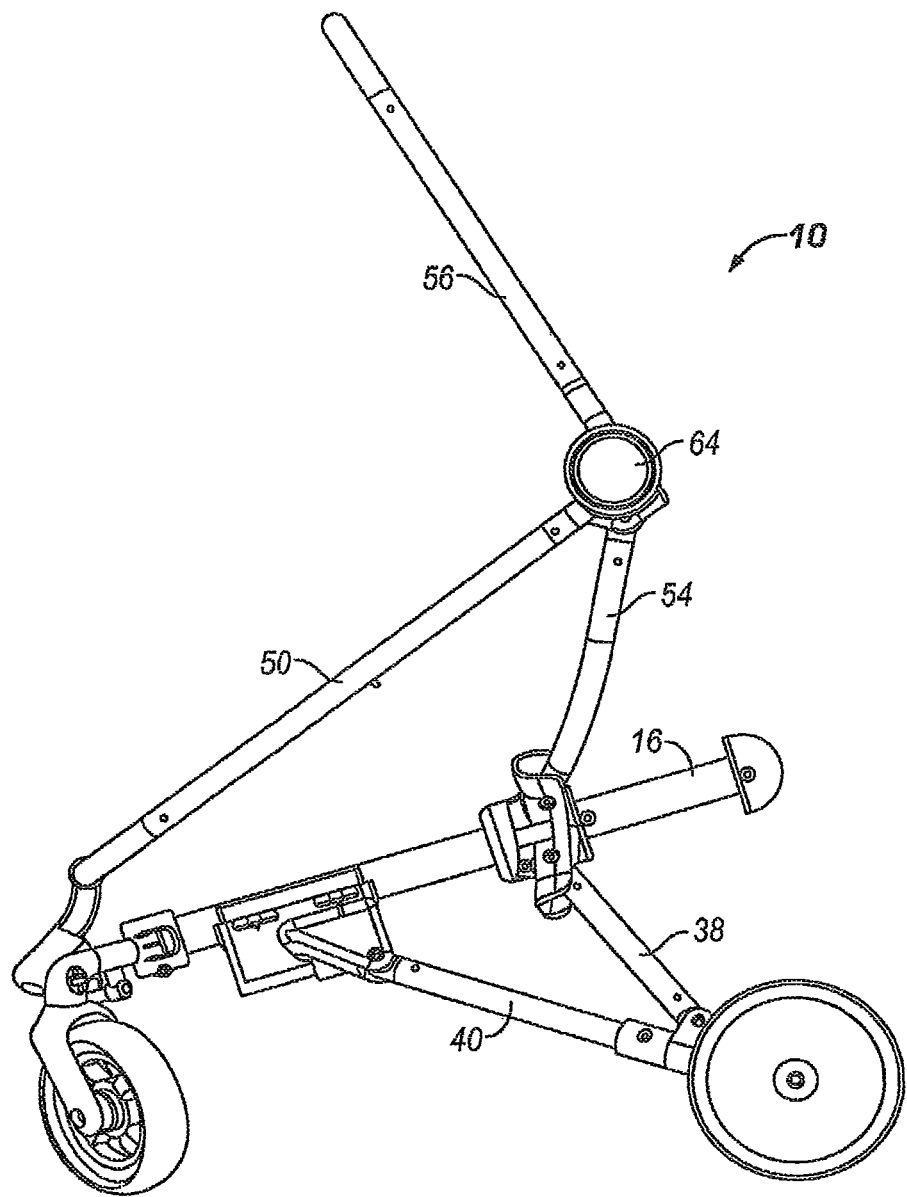
FIG. 6 is a side view of the stroller of FIG. 1 shown in its partially open position.
Figure 7:
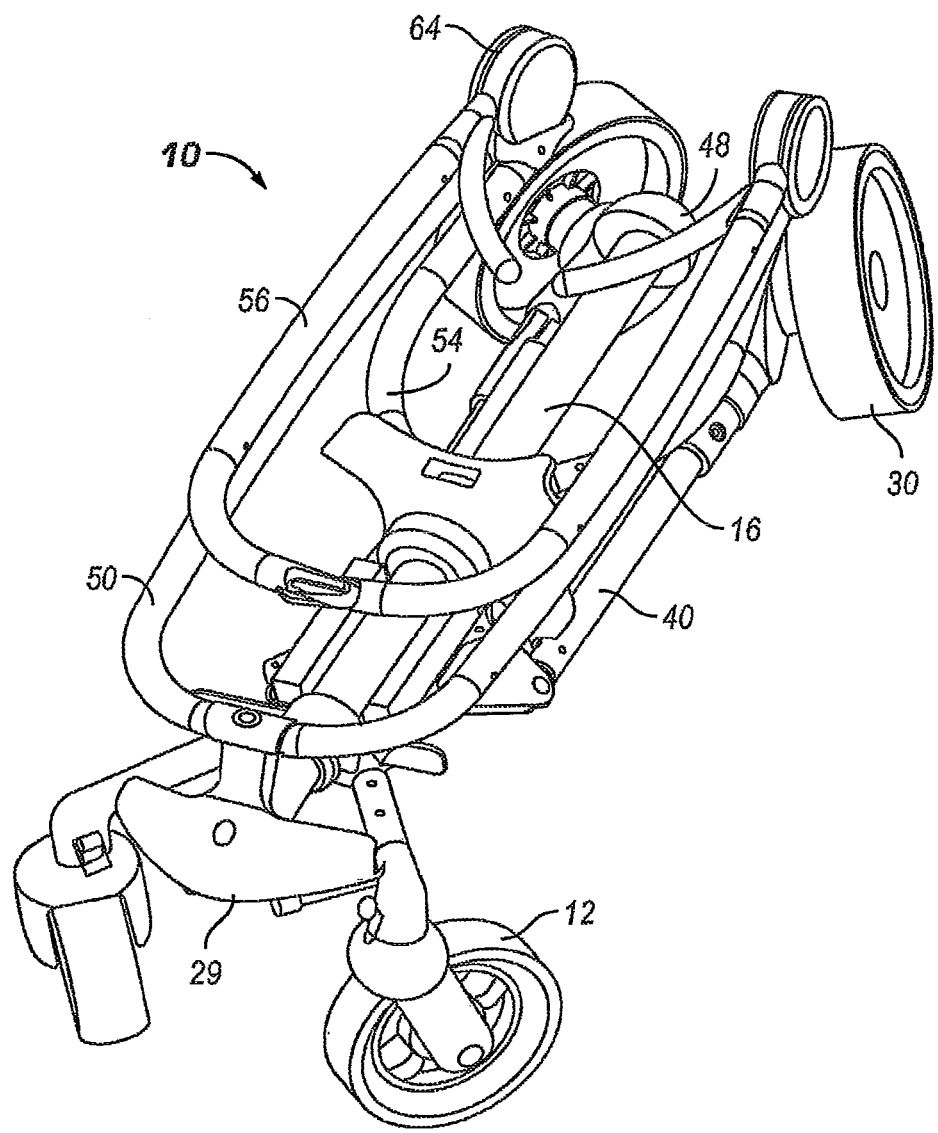
FIG. 7 is an isometric view of the stroller of FIG. 1 shown in its fully closed position.
Figure 8:
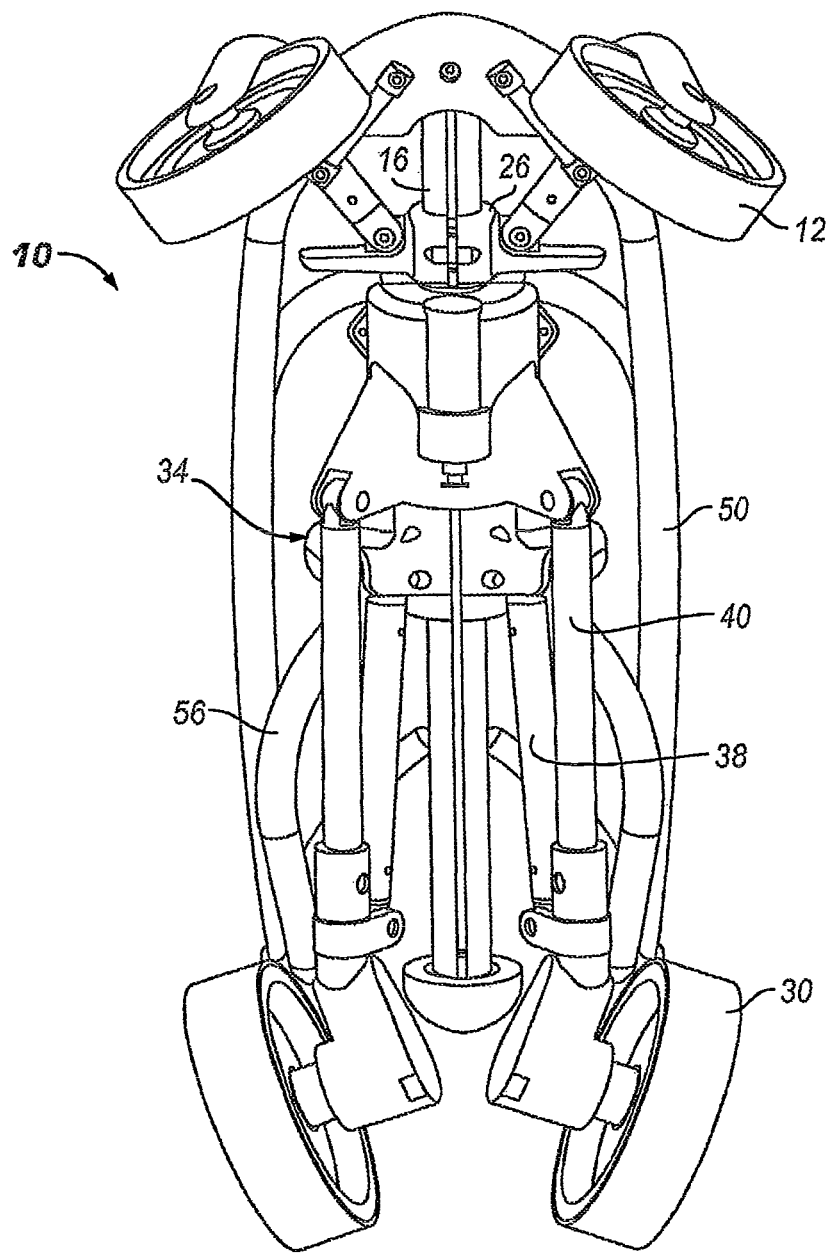
FIG. 8 is a bottom view of the stroller of FIG. 1 shown in its fully closed position.
Figure 9:
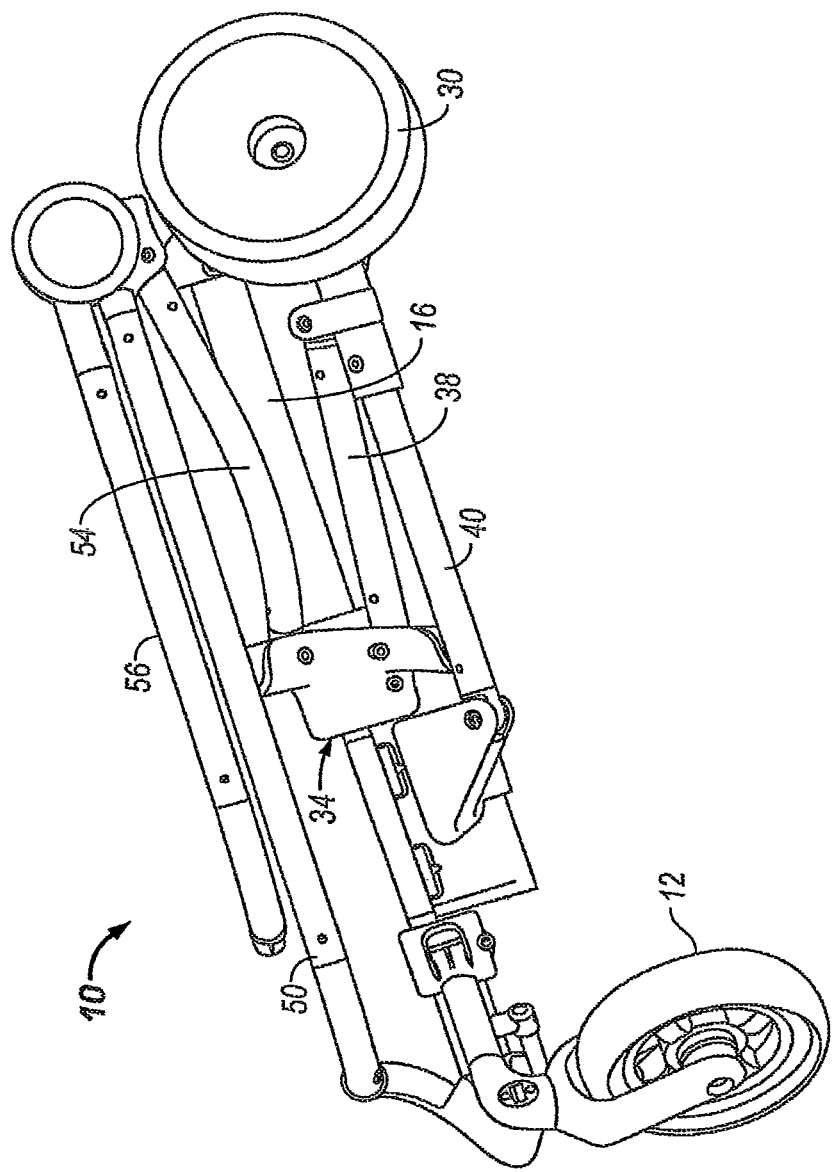
FIG. 9 is a side view of the stroller of FIG. 1 shown in its fully closed position.
Figure 10:
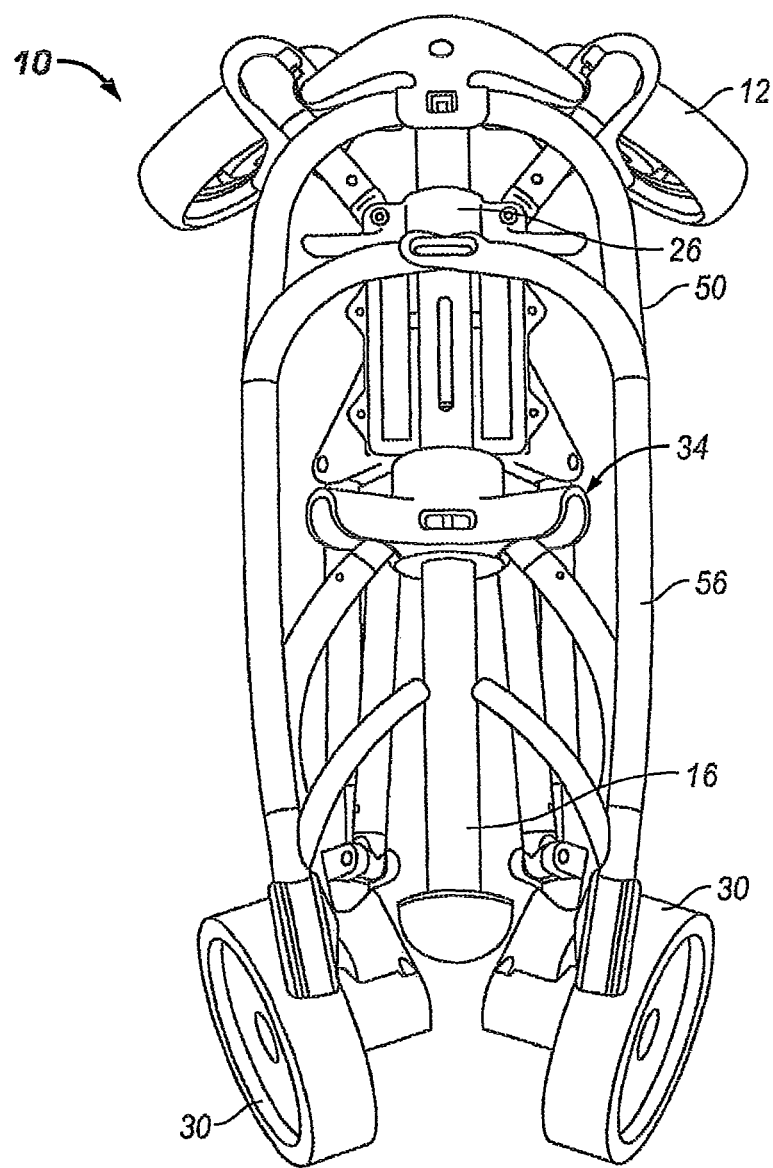
FIG. 10 is a top view of the stroller of FIG. 1 shown in its fully closed position.

The following description is provided to enable those skilled in the art to make and use the described embodiments set forth in the best modes contemplated for carrying out the invention. Various modifications, equivalents, variations, and alternatives, however, will remain readily apparent to those skilled in the art. Any and all such modifications, variations, equivalents, and alternatives are intended to fall within the sprit and scope of the present invention.

A stroller embodying various aspects of the present invention is shown in FIGS. 1 through 16. It will be readily apparent to those skilled in the art, however, that the stroller of FIGS. 1 through 16 represents but one of a wide variety of structures, configurations and modes of operation of strollers which fall within the scope of the present invention.

With reference to FIGS. 1-4 a stroller 10 is illustrated which comprises a pair of front wheels 12 having a front wheel support structure 14 for supporting the front wheels 12. The front wheel support structure 14 is slidably engaged with a guide rail 16 for sliding movement of the front collar portion 26 of the front wheel support structure 14 along the longitudinal axis 18 (see FIGS. 11-13) of the guide rail 16. The front wheel support structure 14 has members 20, 20a, 22, 24 and 26 which are movable between an open position (see FIGS. 1-4) and a collapsed position (see FIGS. 7-10) upon movement of the front collar 26 of the front wheel support structure 14 along the longitudinal axis 18 of the guide rail 16.

More specifically, the illustrated front wheel support structure 14 comprises a pair of generally U-shaped wheel receiving members 20 for receiving respective wheels 12, and axles 20a to allow the wheels 12 to roll about their respective axles 20a. The front wheel receiving members 20 are pivotally connected to a first end 22a of front wheel connector 22 to allow the wheels 12 to pivot about respective axes substantially parallel to their axes 20a to accommodate changes in the rolling direction of the front of the stroller. The second end 22b of the front wheel connector 22 is pivotally connected to the front collar 26. Struts 24 are pivotally connected at a first end 24a to the front wheel connector 22, and the struts 24 are pivotally connected at a second end 24b to the front abutment plate 29.

Accordingly, the front wheel connector 22, strut 24 and front collar 26 form a linkage whereby the front wheels 12 and their associated front wheel support structure 14 are movable between their collapsed positions (FIGS. 7-10) and their open positions (FIGS. 1-4) upon movement of the front collar 26 along the longitudinal axis 18 of the guide rail 16. A front abutment plate 29 is fixedly connected to the front end 16a of the guide rail 16 and receives the front wheel connectors 22 when the front wheel support structure 14 is in its fully open position, such that when the stroller 10 is in its fully open position the front wheel members 22 are secured between the front abutment member 29 and the front wheel connector securing portion 28 of the front collar 26 as shown in FIG. 1. A pair of seat support arms 94 are provided to support a seat (not shown).

With continued reference to FIGS. 1-4 the stroller 10 further comprises a pair of rear wheels 30 having a rear wheel support structure 32 for supporting the rear wheels 30. The rear wheel support structure 32 is slidably engaged with the guide rail 16 for sliding movement of the rear collar portion 34 of the rear wheel support structure 32 along the longitudinal axis 18 of the guide rail 16. The rear wheel support structure 32 has members 34, 36, 38 and 40 which are movable between an open position (see FIGS. 1-4) and a collapsed position (see FIGS. 7-10) upon movement of the rear collar 34 of the rear wheel support structure 32 along the longitudinal axis 18 of the guide rail 16.

More specifically, the rear wheel support structure 32 of stroller 10 comprises a rear axle supporting member 36 at each of the rear wheels 30 for supporting the respective axles 31 of the rear wheels 30 to allow the rear wheels 30 to roll about their respective axles 31. The rear axle support members 36 preferably each have a braking mechanism of the type well known in the art for selectively locking the rear wheels to prevent inadvertent rolling movement of the stroller when the braking mechanism is locked. The rear axle support members 36 are fixedly connected to the rear ends 40a of the rear legs 40, with the front ends 40b of the rear legs 40 pivotally connected to the central collar 42 which is attached in a fixed position to the guide rail 16. The guide rail may be configured to define a suitable mounting position for the central collar 42, and to maintain the central collar 42 at a suitable longitudinal position along the guide rail 16. The rear ends 40a of the rear legs 40 are pivotally connected to the lower ends 38a of the rear wheel connectors 38 through brackets 44, with the upper ends 38b of the rear wheel connectors 38 pivotally connected to the rear member securing portion 46 of the rear collar 34. Accordingly, the rear wheel connector 38, rear leg 40 and rear collar 34 form a linkage whereby the rear wheels 30 and their associated rear wheel support structure 32 are movable between their collapsed positions (FIGS. 7-10) and their open positions (FIGS. 1-4) upon movement of the rear collar 34 along the longitudinal axis 18 of the guide rail 16.

The rear member securing portion 46 of the rear collar 34 has a pair of recesses for receiving the upper ends 38b of the rear wheel connectors 38, and a rear abutment member 48 is fixedly connected to the rear end 16b of the guide rail 16 such that when the stroller 10 is in its fully open position the upper ends 38b of the rear wheel connectors 38 are secured between the rear abutment member 48 and the rear member securing portion 46 of the rear collar 34.

A generally U-shaped frame member comprised of two separate lateral frame components 50 is pivotally connected to the front end 16a of the guide rail 16 through a frame mounting portion 52 of the front abutment member 29, to allow each of the lateral frame components 50 to pivot or rotate relative to the front abutment member 29. A pair of arcuate frame supporting members 54 each have a lower end 54b pivotally connected to the rear member securing portion 46 of the rear collar 34 and an upper end 54a pivotally connected to a respective upper end 50a of the two lateral frame members 50. The rear member securing portion 46 of the rear collar 34 has a pair of recesses for receiving the respective lower ends 54b of the frame supporting members 54 when the rear collar 34 is in its fully open position. Hence, when the rear collar 34 is in its fully open position the lower ends 54b of the frame supporting members 54 are secured between the rear member securing portion 46 of the rear collar 34 and the rear abutment member 48.

Figure 25A:
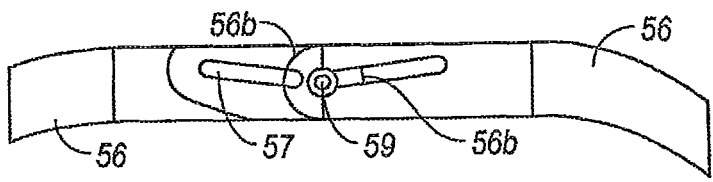
FIG. 25A is a partial enlarged view of a handle bar linkage for interconnecting lateral handle bar components in the stroller of FIG. 1, with the handle bar linkage shown in its fully open position.
Figure 25B:
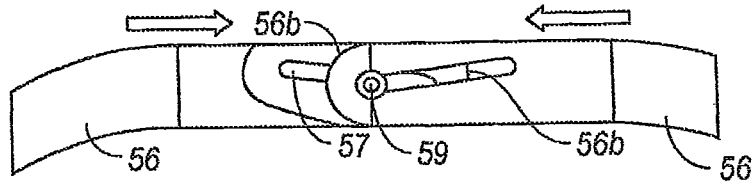
FIG. 25B is a partial enlarged view of the handle bar linkage of FIG. 25A, shown in a partially closed position.

As best seen in FIGS. 1, 10, 25A and 25B, a generally U-shaped handle bar is provided comprised of two lateral handle bar components 56 having lower ends 56a pivotally connected to respective upper ends 50a of the frame member. Adjacent the upper end 56b of one of the lateral handle bar components 56 an elongated slot 57 is provided, and adjacent the upper end 56b of the other lateral handle bar component 56 a suitable pin 59 is provided which is slidably received and retained within the slot 57 of the other lateral handle bar component 56. This slidable linkage allows the upper ends 56b of the lateral handle bar components 56 to move toward and away from one another (as seen in comparing FIGS. 25A and 25B) as the lateral handle bar components 56 pivot between their collapsed and open positions. This allows the overall width of the generally U-shaped handle bar to decrease (consistent with the decrease in the lateral width of the wheels) as the lateral handle bar components 56 move from their open position as shown in FIG. 1 to their collapsed positions shown in FIG. 10 wherein a portion of the upper ends 56b of the lateral handle bar components 56 overlap one another to provide a compact configuration. As best seen in FIGS. 25A and 25B, the handle bars have an inclined portion adjacent their ends at the area in which the upper end portions of the handle bar members overlap to facilitate sliding and overlapping movement of the end portions without requiring pivotal movement of either of the lateral handle bar members. Accordingly, the two lateral handle bar components 56 act as a single generally U-shaped handlebar when the two lateral handle bar components 56 are in their open positions as in FIG. 1 at which they function as a single handle bar unit due to the pin-in-slot linkage maintaining the upper ends 56b of the two lateral handle bar components 56 connected together.

In accordance with an aspect of the invention, two lateral handle bar components which are not permanently interconnected at their upper ends may be utilized. It may be desirable to provide a handle bar latch mechanism (not shown) which engages the upper ends 56b of the two lateral handle bar components 56 to retain them interconnected when the handle bar components 56 are in their open position, but which allows release of the two lateral handle bar components 56 to allow them to move independently of one another when not in their open position. The release of the handle bar latch mechanism may be automated so that the latch mechanism releases or unlatches upon actuation of a control switch or a controller. The stroller may be constructed such that release of the handle bar latch mechanism, either manually or automatically, may actuate automatic movement of one or more additional stroller components as suitable.

With reference now to FIGS. 1 and 14-16, each of the two lateral handle bar components 56 and the frame supporting members 54 are pivotally connected to the upper ends 50a of the frame member. More specifically, the frame supporting member 54 has a frame gear member 58 fixed thereto such that upon pivoting movement of the frame supporting members 54 relative to the frame member 50 about pivot pin 60 the frame gear member 58 pivots about pivot pin 60 in the same rotational direction. The ends 56a of the handle bar 56 have handle bar gear members 62 fixed thereto and in engagement with the frame gear member 58 such that upon pivotal movement of the frame supporting members 54 relative to the frame member 50 the handle bar components 56 are pivoted relative to the frame member 50. This defines a simultaneous folding and unfolding gear arrangement referred to generally at 51.

Figure 14:
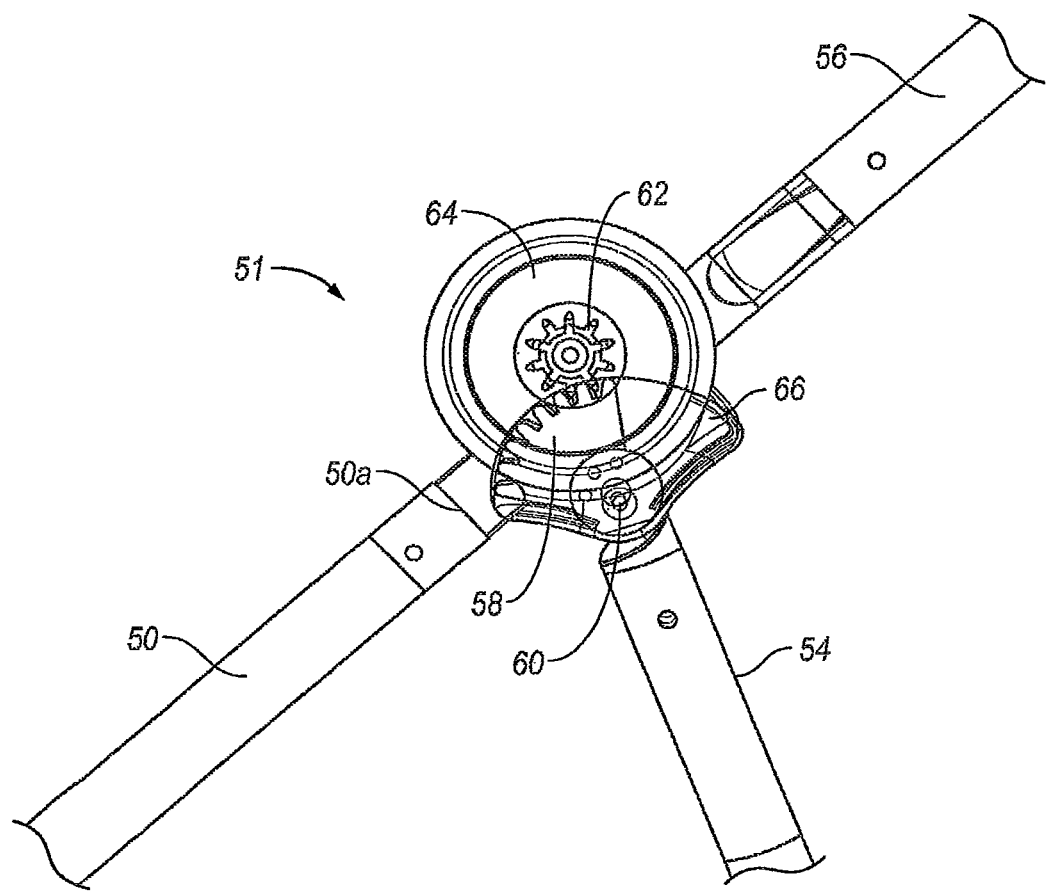
FIG. 14 is a partial side schematic view of the linkage of the handle bar of the stroller of FIG. 1 shown in its fully open position.
Figure 15:
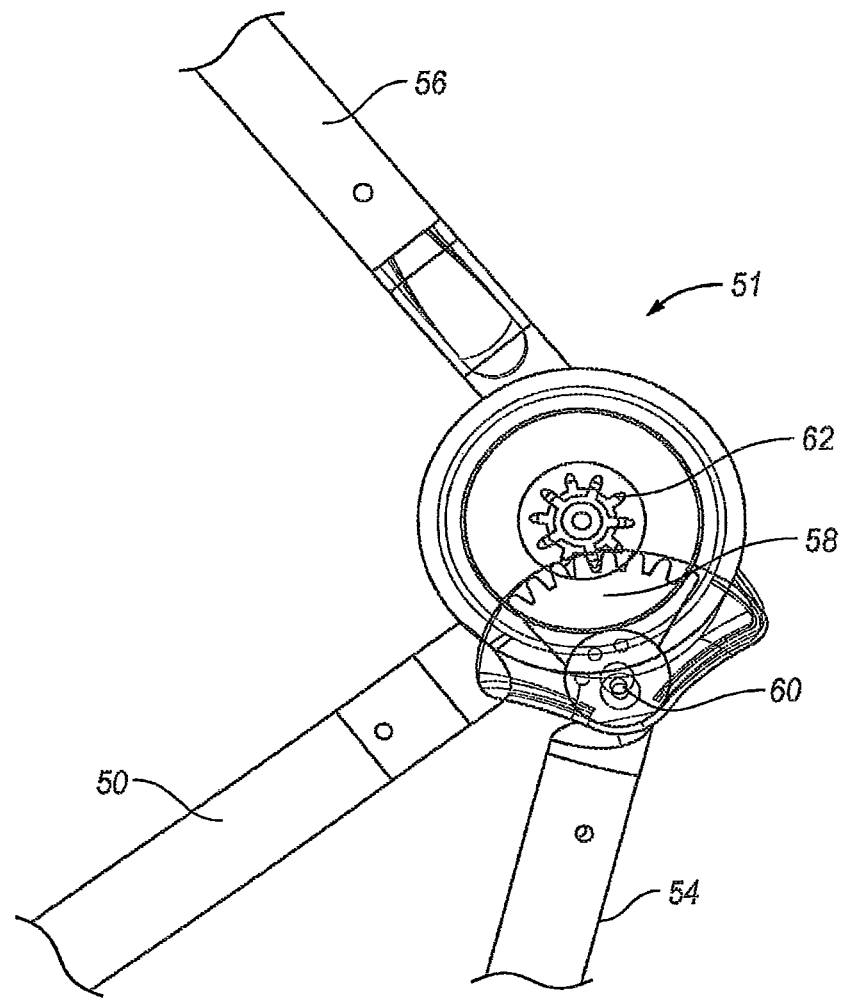
FIG. 15 is a partial side schematic view of the linkage of FIG. 14 shown in its partially closed position.
Figure 16:
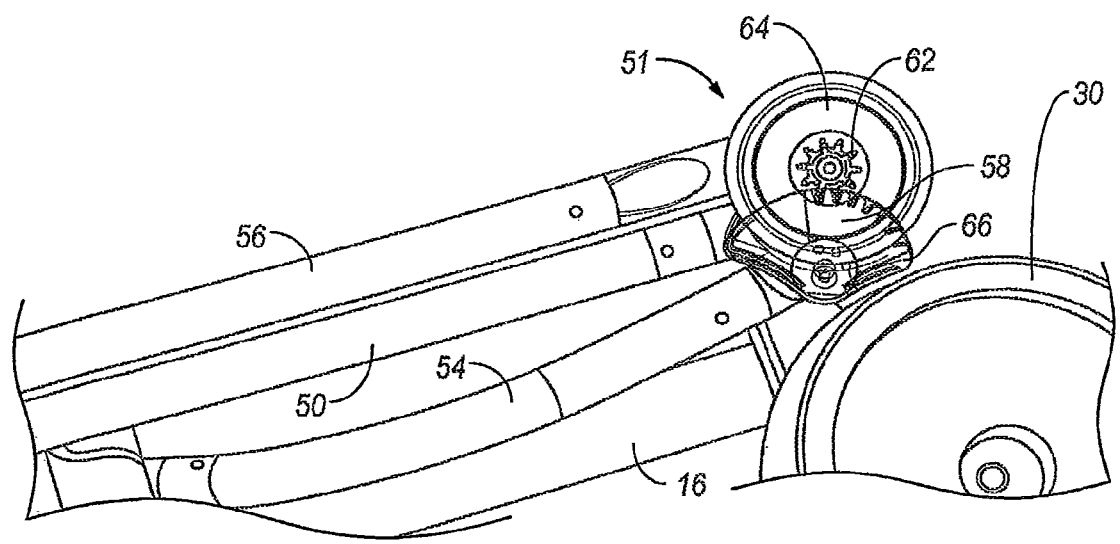
FIG. 16 is a partial side schematic view of the linkage of FIG. 14 shown in its fully closed position.

More specifically, upon movement of the frame supporting members 54 from their fully opened position of FIG. 14 to their partially open position of FIG. 15, the frame gear member 58 pivots about pivot pin 60 which rotates the handle bar gear member 62 which pivots both of the handle bar components 56 forward from the open position of FIG. 14 to the partially open position of FIG. 15. The gears and handle bar components are configured such that upon movement of the frame supporting members 54 to their fully collapsed positions relative to the frame members 50 as shown in FIG. 16, the handle bar components 56 are moved to their fully collapsed positions as shown in FIG. 16. Similarly, upon movement of the frame supporting members 54 from their fully collapsed position of FIG. 16 toward their fully open position of FIG. 14, the handle bar components 56 are moved through the gear arrangement toward its fully open position as well.

Although the illustrated and described gear arrangement 51 may be used to achieve the desired movement of the handle bar 56 to its fully collapsed position upon movement of the frame supporting members 54 to their fully collapsed position, and to achieve the desired movement of the handle bar 56 to its fully open position upon movement of the frame supporting members 54 to their fully open position, a variety of other arrangements may be used in addition to, or instead of, gears for achieving this, such as mechanical linkages, a drive mechanism in operative engagement with the handle bars, cable connections, pneumatics, and others. The handle bar gear member 62 resides within a gear housing 64, and frame gear member 58 resides within frame gear member enclosure 66 which also accommodates a portion of the gear housing therein, so the frame gear member 58 and handle bar gear member 62 are covered at all times throughout collapsing, opening and use of the stroller.

Figure 14A:
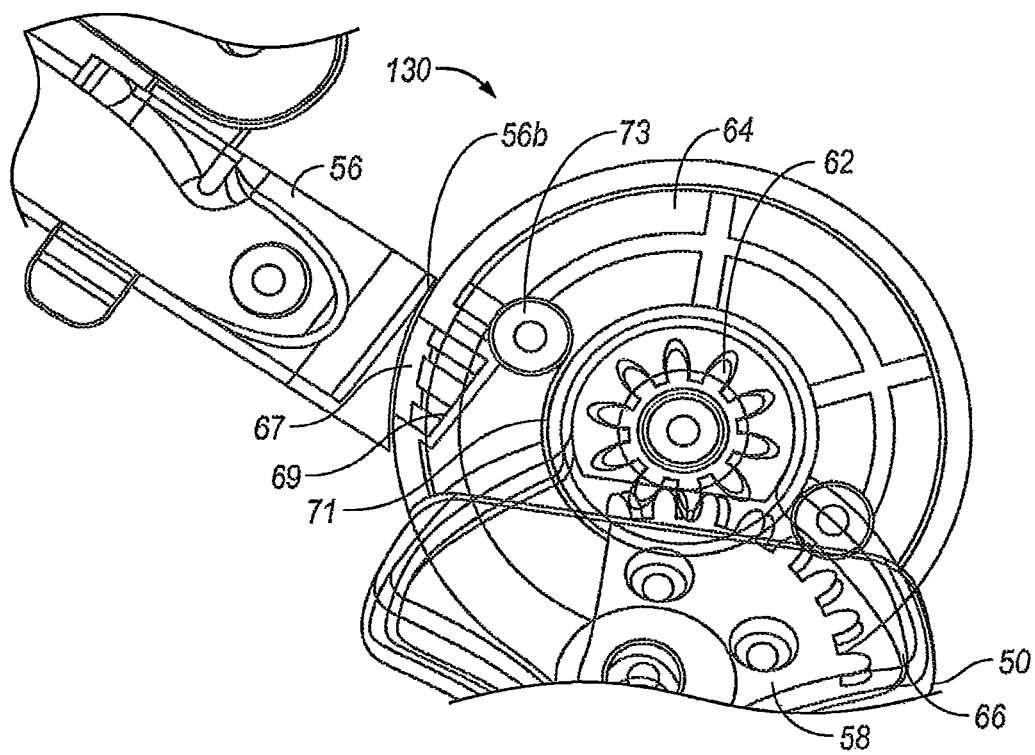
FIG. 14A is an enlarged view of a latching mechanism.

With reference to FIG. 14A, the above described gear arrangement 51 can be modified to provide a latching mechanism suitable for use in connection with inventive aspects of strollers of the present invention. A latch member 67 is provided at the end 56b of the lateral handle bar component 56 which is spring biased to its extended position extending outwardly from the end 56b, as shown in FIG. 14A. The latch member 67 is movable to a retracted position not extending outwardly from the end 56b. A recess 69 for receiving the latch member 67 when it is in its extended position is provided in the gear housing 64 to receive and engage the latch member 67 therein, and thereby engage the handle bar member 56. Due to the single degree of freedom of the stroller linkage, this prevents the stroller from being moved toward its collapsed or folded position. The latch member 67 can be released from the recess 69 by moving the latch to its retracted position to disengage the latch member 67 and thereby disengage the handle bar member 56 to allow rotational movement of the handle bar member and accordingly allow movement of the stroller toward its collapsed position. An arcuate slot 71 is provided in the gear housing 64 which slidably receives and retains a pin or rivet 73 on the frame member 50 to limit the extent of pivotal movement of the frame member 50 relative to the handle bar component 56 to provide alignment of the recess 69 with the latch member 67 to assure the latch member is properly received and engaged in the recess 69 when the stroller is in its open position and the latch member 67 is spring biased into the recess 69. The end 56*b* is arcuate to correspond to the arcuate or circular perimeter of the gear housing 64, whereby after the latch has been disengaged and the stroller has been moved to its collapsed position, upon movement of the stroller toward its open position the latch member 67 is spring biased against the arcuate perimeter of the gear housing 64 until the stroller is fully open, at which point the latch member 67 is aligned with, and spring biased into, the recess 69 to prevent movement of the stroller toward its collapsed position until the latch member 67 is retracted.

Figure 11:
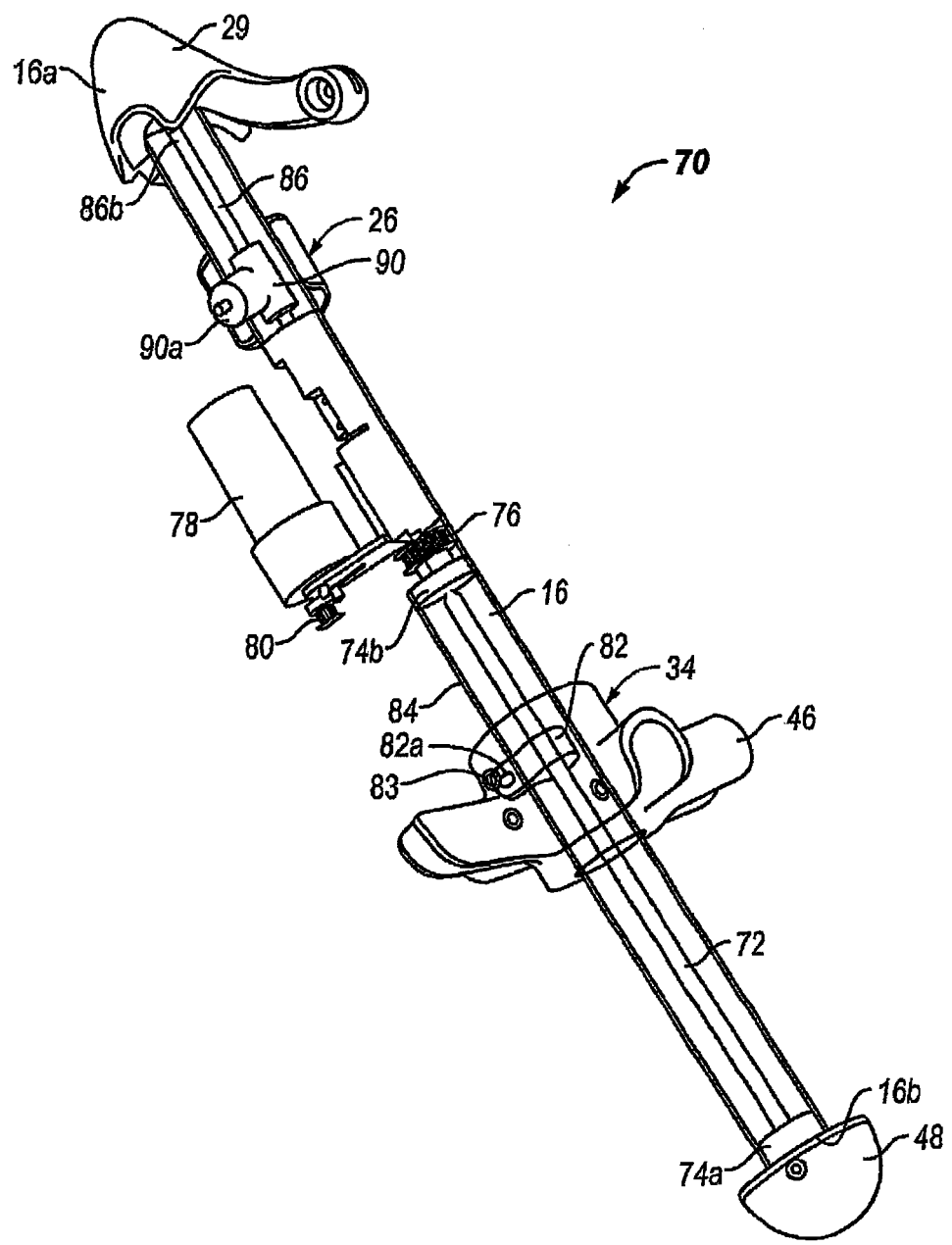
FIG. 11 is a schematic isometric view illustrating the drive mechanism of the stroller of FIG. 1.
Figure 12:
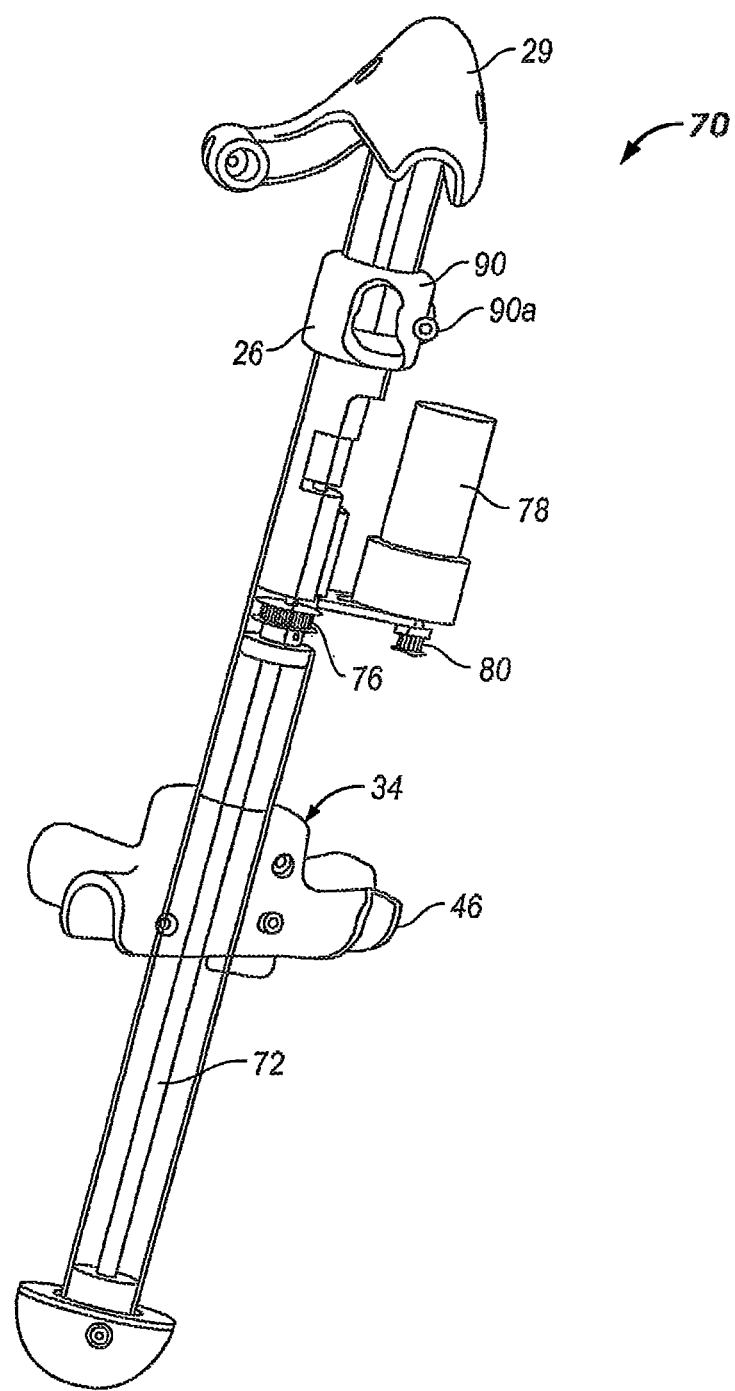
FIG. 12 is a side schematic view of the drive mechanism of FIG. 11.
Figure 13:
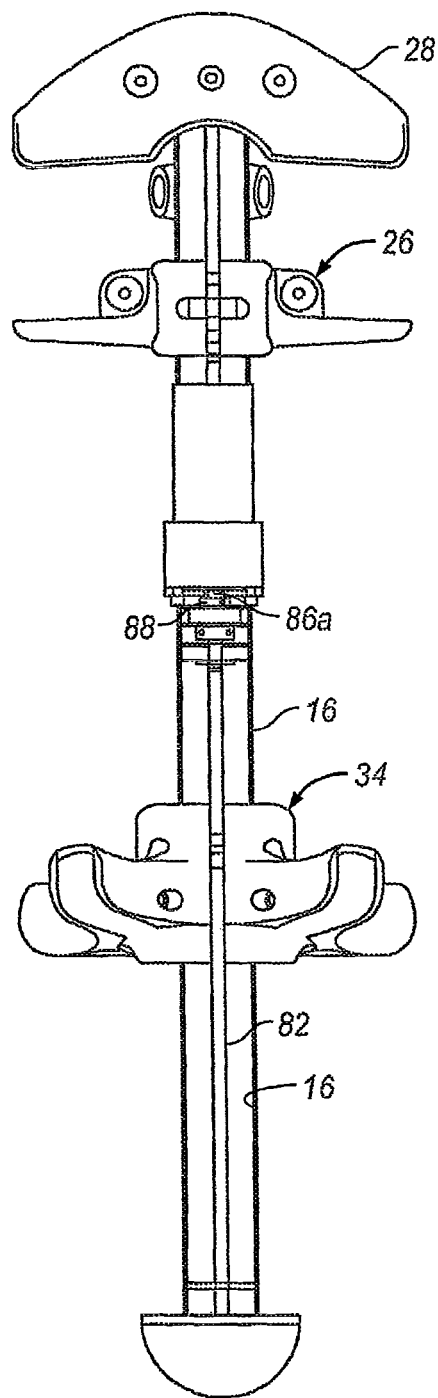
FIG. 13 is a bottom view illustrating of the drive mechanism of FIG. 12.

With reference now to FIGS. 11-13, the stroller 10 has a drive mechanism 70 through which the stroller 10 may be moved back and forth between its open and collapsed positions. A rear threaded member 72 is mounted in the guide rail 16 for rotation within the guide rail interior about the longitudinal axis of the rear threaded member, with the longitudinal axis of the rear threaded member being coaxial with the longitudinal axis 18 of the guide rail. The rear threaded member 72 is supported by bearings 74*a* and 74*b* at each end thereof, and a threaded member pulley 76 is fixedly connected to the rear threaded member 72. It is preferred that the threaded member pulley 76 is mounted in close proximity to the bearing 74*b*, so that lateral forces exerted on the threaded member pulley 76 are taken upon by the bearing 74*b* such that separate bearings are not required for the front threaded member 86 which is discussed below. A motor 78 is mounted in a fixed position on the guide rail and has a drive pulley 80 connected to its shaft and a belt (not shown) extends between the drive pulley 80 and threaded member pulley 76 through which the threaded member pulley 76 is rotated about its longitudinal axis upon actuation of the motor 78. A rear nut member 82 is in threaded engagement with the rear threaded member 72, with the rear nut member 82 having a mounting portion 82*a* which extends outwardly of the guide rail 16 through the longitudinally extending slot 84 in the guide rail 16.

Accordingly, as the motor 78 is actuated, the motor 78 effects rotation of the rear threaded member 72 through the belt and pulleys (with the lateral forces exerted on the threaded member pulley 76 by the belt being taken up by the bearings 74*a* and 74*b*) whereby the nut member 82 (which is prevented from rotating together with the rear threaded member 72 due to the mounting portion 82*a* of the rear nut member 82 extending outwardly of the slot 84 and bearing against the sides of the slot when the rear threaded member 72 rotates) is driven longitudinally along the rear threaded member 72. The rear collar 34 is mounted to the mounting portion 82*a* of the rear nut member 82 such that the rear collar 34 and the rear member securing portion 46 connected thereto moves longitudinally along the guide rail 16 together with the rear nut member 82 as the rear threaded member 72 is rotated by the motor 78. With the rear wheel support structure 32 engaged with the rear collar 34, the longitudinal movement of the rear collar 72 along the guide rail 16 thereby effects movement of the rear wheel support structure 32 between its collapsed and open positions, with the rear collar 34 moving in a first longitudinal direction along the guide rail 16 upon rotation of the rear threaded member 72 in first rotational direction, and the rear collar 34 moving in a second longitudinal direction along the guide rail 16 upon rotation of the rear threaded member 72 in an opposition, second rotational direction to move the rear wheel support structure between its collapsed and open positions. Hence, the drive mechanism 70 is operatively engaged with the rear wheel support structure 32 to move the rear wheels 30 between their collapsed and open positions.

With continued reference to FIGS. 11-13, a front threaded member 86 is mounted in the guide rail 16 for rotation within the guide rail interior about the longitudinal axis of the front threaded member, with the longitudinal axis of the front threaded member being coaxial with the longitudinal axis 18 of the guide rail 16 in a manner similar to the rear threaded member 72. The rear end 86*a* of the front threaded member 86 is coupled to the rear threaded member 72 through coupling member 88 such that the front threaded member 86 and the rear threaded member 72 rotate together. The front end 86*b* of the front threaded member 86 is supported in a suitable recess in the rear side of the front abutment member which allows rotation of the front threaded member 86 about its longitudinal axis, which is coaxial with the longitudinal axis of the rear threaded member 72.

A front nut member 90 is in threaded engagement with the front threaded member 86, with the front nut member 82 having a mounting portion 90*a* which extends outwardly of the guide rail 16 through the longitudinally extending slot 84 in the guide rail 16. Accordingly, as the motor 78 is actuated, the motor 78 effects rotation of the front threaded member 86 (simultaneously and in the same rotational direction as the rear threaded member 72) whereby the front nut member 90 (which is prevented from rotating together with the front threaded member 86 due to the mounting portion 90*a* of the front nut member 82 extending outwardly of the slot 84 and bearing against the sides of the slot when the front threaded member 86 rotates) is driven longitudinally along the front threaded member 86. The front collar 26 is mounted to the mounting portion 90*a* of the front nut member 90 such that the front collar 90 and the front wheel connector securing portion 28 connected thereto moves longitudinally along the guide rail 16 together with the front nut member 90 as the front threaded member 86 is rotated by the motor 78. With the front wheel support structure 14 engaged with the front collar 26, the longitudinal movement of the front collar 26 along the guide rail 16 thereby effects movement of the front wheel support structure 14 between its collapsed and open positions, with the front collar 26 moving in a first longitudinal direction along the guide rail 16 upon rotation of the front threaded member 86 in first rotational direction, and the front collar 90 moving in a second longitudinal direction along the guide rail 16 upon rotation of the front threaded member 86 in an opposition, second rotational direction to move the front wheel support structure 14 between its collapsed and open positions. Hence, the drive mechanism 70 is operatively engaged with the front wheel support structure 14 to move the front wheels 12 between their collapsed and open positions.

As mentioned above, the front and rear threaded members 86 and 72 are coaxial and are coupled together so that they rotate simultaneously in the same direction. They also have opposite threads (not shown) such that when the front and rear threaded members 86 and 72 rotate together in a first rotational direction the front and rear collars 26 and 34 move toward one another to move the front and rear wheel support structures 14 and 32 toward their collapsed positions, and when the front and rear threaded members rotate together in a second, opposite rotational direction the front and rear collars 26 and 34 move away from one another to move the front and rear wheel support structures 14 and 32 toward their open positions. Due to differences in the linkages of the front and rear wheel support structures 14 and 32 of the stroller 10, the threads of the front and rear threaded members 86 and 72 are different from each other, such that upon the same amount of rotational movement of the front and rear threaded members 86 and 72 the rear collar 34 is displaced a greater distance along the longitudinal axis 18 of the guide rail 16 than the front collar 26 is displaced along the longitudinal axis 18 of the guide rail 16 (with the simultaneous displacement of the front and rear collars 26 and 34 being in opposite directions). It will be readily apparent to those skilled in the art that a single threaded member may be provided instead of two separate threaded members, with the single threaded member having two distinct, opposite thread portions.

Accordingly, it will be appreciated that with the coupled front and rear threaded members being considered part of the frame, the stroller 10 provides a frame, a front wheel support structure, and a rear wheel support structure which define a linkage having a single degree of freedom, such that movement of any one of the coupled threaded members, front wheel support structure, or rear wheel support structure 34 relative to one another toward their collapsed or open positions may effect movement of the others toward their collapsed or open positions. By accurately controlling and/or preventing rotation of the coupled front and rear threaded members, the movement and/or securing in place of the front and rear wheel support structures may be achieved. Further, with the handle bars 56 operatively coupled to the frame supporting members 54 of the rear wheel assembly by the gear arrangement discussed above, the coupled threaded members, front wheel support structure, rear wheel support structure and handle bars form a linkage having a single degree of freedom, whereby by accurately controlling and/or preventing rotation of the coupled front and rear threaded members, the movement and/or securing in place of the handle bars, and the front and rear wheel support structures may be achieved.

A control switch 92 is provided, preferably in the handle bar 56 for ease of access, for effecting actuation of the drive mechanism 70. The control switch 92 is operatively connected to the motor 78 (which may be through a controller, such as a microprocessor, not shown) to control actuation of the motor 78, which in turn controls the drive mechanism 70, which in turn controls movement of the front and rear wheel support members 14 and 32 between their collapsed and open positions. Preferably, the wires extending between the control switch 92 and motor 78 are all disposed internally of the stroller elements, such as extending internally within hollow tubular members. The control switch 92, or a separate control switch and/or a common controller, may also be operatively coupled to one or more latch mechanisms to move the latch mechanisms from their latched positions in which they prevent the stroller from moving from its fully open position toward its collapsed position, to their unlatched positions in which they allow the stroller to move from its fully open position towards its collapsed position. The motor 78, or a separate drive, may be operatively connected to a control switch and/or controller to effect automatic movement of the latches upon actuation by the control switch 94. The unlatching of the one or more latches is preferably carried out prior to, or simultaneous with the initiation actuation of the motor 78 and drive mechanism 70 of which the motor may be a part.

In accordance with an aspect of the invention, a control switch may be provided at or in proximity with one or more latches on the stroller (or operatively engaged with one or more latches), such that upon, or subsequent to, manually unlatching the one or more latches the actuator is actuated to effect automatic movement of the desired one or more stroller components from a first position to a second position. That is, a control switch such as a position sensing switch 206 (which may be an optical switch, electrical contact switch, or any other type of switch) may be provided which is operatively engaged with a controller which controls the actuation of the drive mechanism as desired (which may be in any of a wide variety of rates, sequences, options, etc.) The control switch or switches may be located and configured to be triggered or actuated during conventional manual unlatching of the latch or latches, or may be at a convenient location on the stroller which allows the control switch to be easily actuated while, or immediately subsequent to, unlatching of the latch or latches. It may be desirable to provide an arrangement in which two or more control switches associated with respective latches are required to both be actuated to effect automatic movement of the desired one or more stroller components from a first position to a second position.

A single control switch may actuate a single controller, such as a microprocessor 208, which in turn actuates two or more separate drive mechanisms. Alternatively, a single control switch may actuate two or more controllers which each in turn actuate one or more separate drive mechanisms.

The stroller 10 may also have a display 96, such as on the handle bar 56, to provide information to the user as to any of a wide variety of information such as confirmation that the front and rear wheel support structures are secured in their fully open positions, that latches are locked, that a brake is engaged, ambient temperature, distance traveled, time, or the like.

Figure 19:
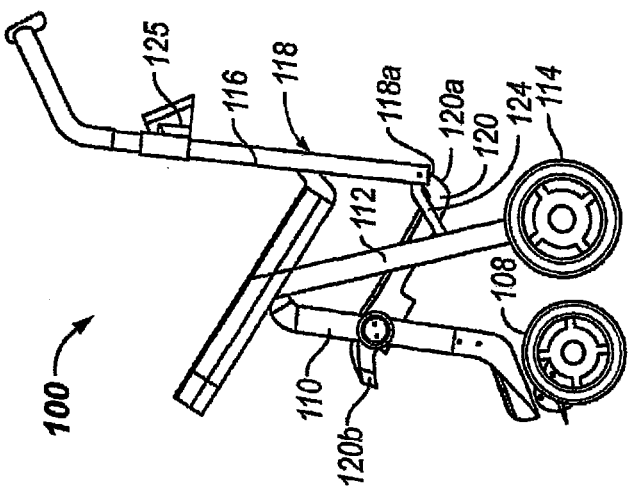
FIG. 19 is a side view of the stroller of FIG. 17 shown in its partially open position.

With reference now to FIGS. 17-20, a stroller 100 embodying various aspects of the present invention is illustrated. The stroller 100 is movable or foldable between a collapsed position (see FIG. 20) and an open or operative position (see FIGS. 17 and 18). An intermediate stroller position between collapsed and open is illustrated in FIG. 19.

The stroller 100 has a front wheel support structure 104 having a pair of laterally spaced front support legs 110 with front wheels 108 rotatably mounted thereon. The stroller 100 also has a rear wheel support structure 106 having a pair of laterally spaced rear support legs 112 with rear wheels 114 rotatably mounted thereon. The upper ends of the respective front support legs 100 and rear support legs 112 are pivotally connected to one another which allows the front and rear wheels 108 and 114 to pivot toward and away from one another.

Figure 17:
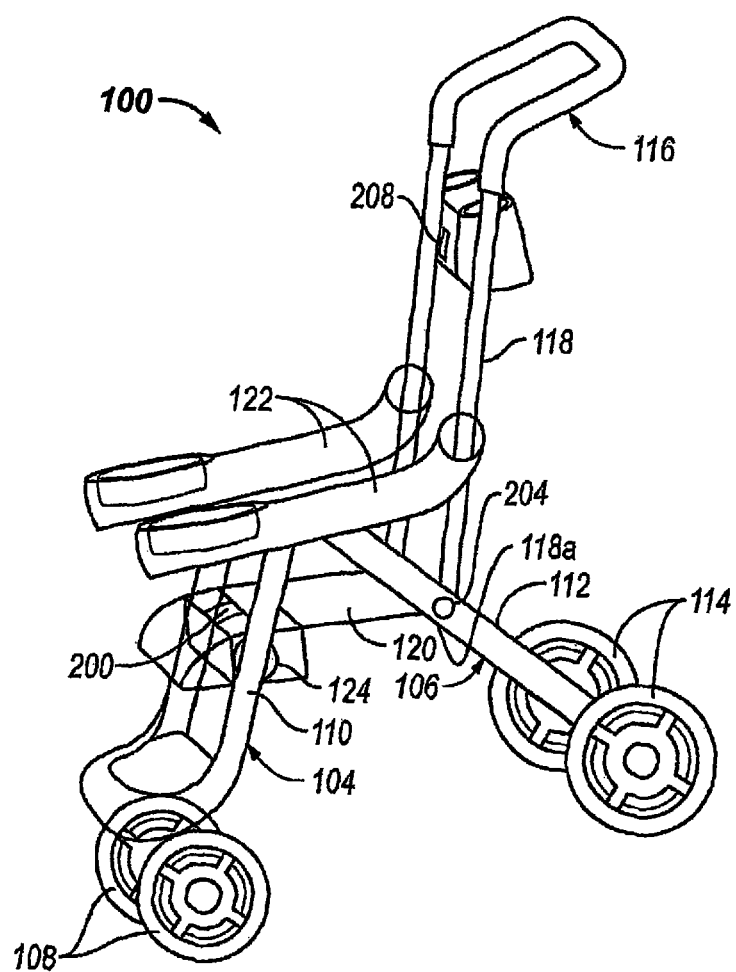
FIG. 17 is an isometric schematic view of a stroller embodying various features of the present invention, shown in its fully open position.

As best seen in FIGS. 17 and 19, the stroller 100 also has a handlebar 116 with a pair of laterally spaced legs 118, which legs 118 are pivotally connected at their ends 118*a* to respective sides of the rear end 120*a* of a seat member 120 to allow pivotal movement between the seat member 120 and handlebar legs 118. The seat member 120 is also pivotally connected near its front end 120*b* to the front support legs 110 to allow pivotal movement between the seat member 120 and the front support legs 110. The stroller 100 has a pair of arms 122 (see FIG. 17) which are each pivotally connected at one of their ends to the handlebar legs 116 and pivotally connected to the rear support legs 112. A link 123 is provided extending between and pivotally connected to the lower end 118*a* of the handlebar and the rear support leg 112. Accordingly, the front support legs 110, rear support legs 112, seat member 120, arms 122, links 123 and handlebar 116 define a linkage having a single degree of freedom, such that each of these components move simultaneously between their collapsed and open position, and such that prevention of motion of various components relative to each other prevents movement of the stroller between its collapsed and open positions. The link 123 facilitates the linkage mechanism of the stroller 100 as having a single degree of freedom, with left and right sides coupled together by cross braces. A locking mechanism or latch may be provided which, when moved to its locking or latched position, allows locking of the stroller 100 in its open position during use.

Figure 20:
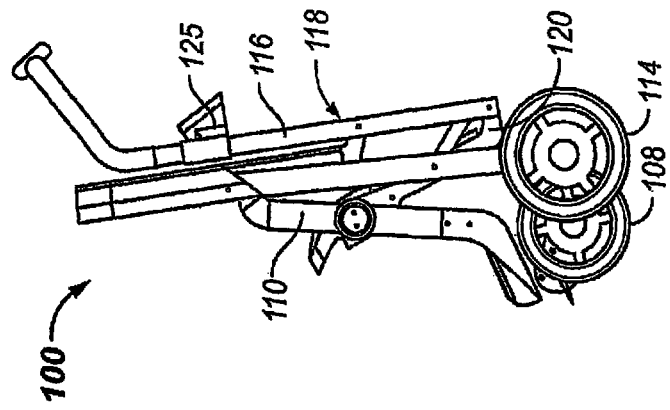
FIG. 20 is a side view of the stroller of FIG. 17 shown in its fully closed position.
Figure 18:
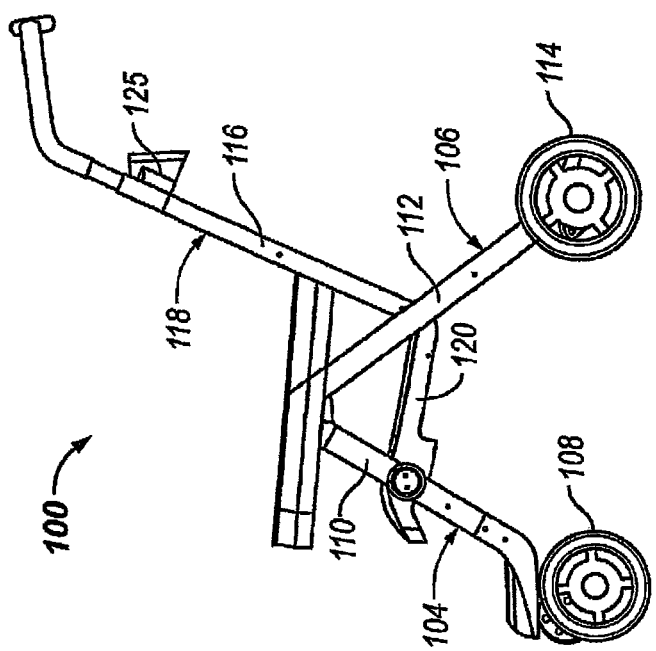
FIG. 18 a side view of the stroller of FIG. 17 shown in its fully open position.

In accordance with an aspect of the invention, a drive motor or mechanism 124 is operatively coupled to both the seat member 120 and front support legs 110 at their pivot axis such that, when actuated, the motor 124 pivots the seat member 120 relative to the front support legs 110 (as seen in comparing FIGS. 18 through 20). Because the linkage mechanism of the stroller 100 has a single degree of freedom, the pivoting of the seat 120 relative to the front support legs 110 by the motor 124 effects movement of each of the front support legs 110, rear support legs 112, seat member 120, arms 122 and handlebar 116 between their open and collapsed positions. The illustrated stroller 100 has the motor 124 placed at the pivot axis between the seat 120 and front support member 110 with the shaft of the motor 124 coaxial with the pivot axis between the seat 120 and front support legs 110 in a direct drive system, with the motor 124 mounted to the front support leg 110 and the motor shaft connected to the seat member 120. However, it may be desirable to have the motor 124 mounted at a different location on the stroller 100 such as under the seat 120 using an indirect drive system in which the motor is not located at the pivot axis, but is mounted to the front support member 110 and the motor shaft is operatively connected to the seat member 120.

Although the illustrated stroller 100 has the motor controlling pivoting movement of the front support leg 110 relative to the seat member 120, one or more motors may be placed at any one or more pivot axes of the linkage to pivot any two pivotally connected members of the single degree of freedom linkage, whereby due to the single degree of freedom of the linkage the one or more motors may control movement of the stroller between its open and collapsed positions. Also, in accordance with a further aspect of the invention, one or more motors or other drives may be provided a suitable location away from the stroller component or components which are desired to be moved, with a suitable operative connection extending between the one or more drives and the stroller component or components to be moved by the drive. Also, in accordance with another aspect of the present invention, a stroller may be provided in which separate drive mechanisms move different components of the stroller which are not interconnected as a single degree of freedom linkage, or one drive mechanism may drive and effect movement of a plurality of different components of the stroller which are not interconnected, or one drive mechanism may drive a plurality of different components of the stroller which are interconnected as a single degree of freedom linkage with another drive mechanism driving one or more additional components of the stroller.

In accordance with another aspect of the invention, a stroller may be provided in which a drive mechanism is operatively connected with any one or more stroller components to move the one or more stroller components between any first desired position and any second desired position. Such stroller components may be wheel support structures, handlebars, cup holders, canopies, or any other stroller component for which it is desired to easily and automatically move from a first position to a second position. Such movement may be to achieve compactness in a first position and operational use in a second position, but the invention is not limited to this and there is a virtually limitless number of potential advantageous stroller embodiments in which it may be desirable to facilitate easy movement of one or more stroller components between first position and one or more other positions.

A stroller may be provided in which a drive mechanism is operatively connected with one or more components which are not related to moving the front or rear wheels, or left and right wheels, between open and collapsed positions. As an example, additional stroller components such as visors, cup holders, etc. may have a drive mechanism operatively connected therewith to move them between a first desired position and one or more other desired positions, which movement may be carried out in conjunction with the opening and collapsing movement of the stroller and/or independently. Accordingly, by merely actuating a readily accessible control switch which is operatively connected to a drive mechanism of the stroller (which operative connection may be direct or through a controller), one or more stroller components operatively connected to the drive mechanism (which operative connection may be direct or indirect) may be easily moved from a first desired position to a second desired position.

Figure 21:
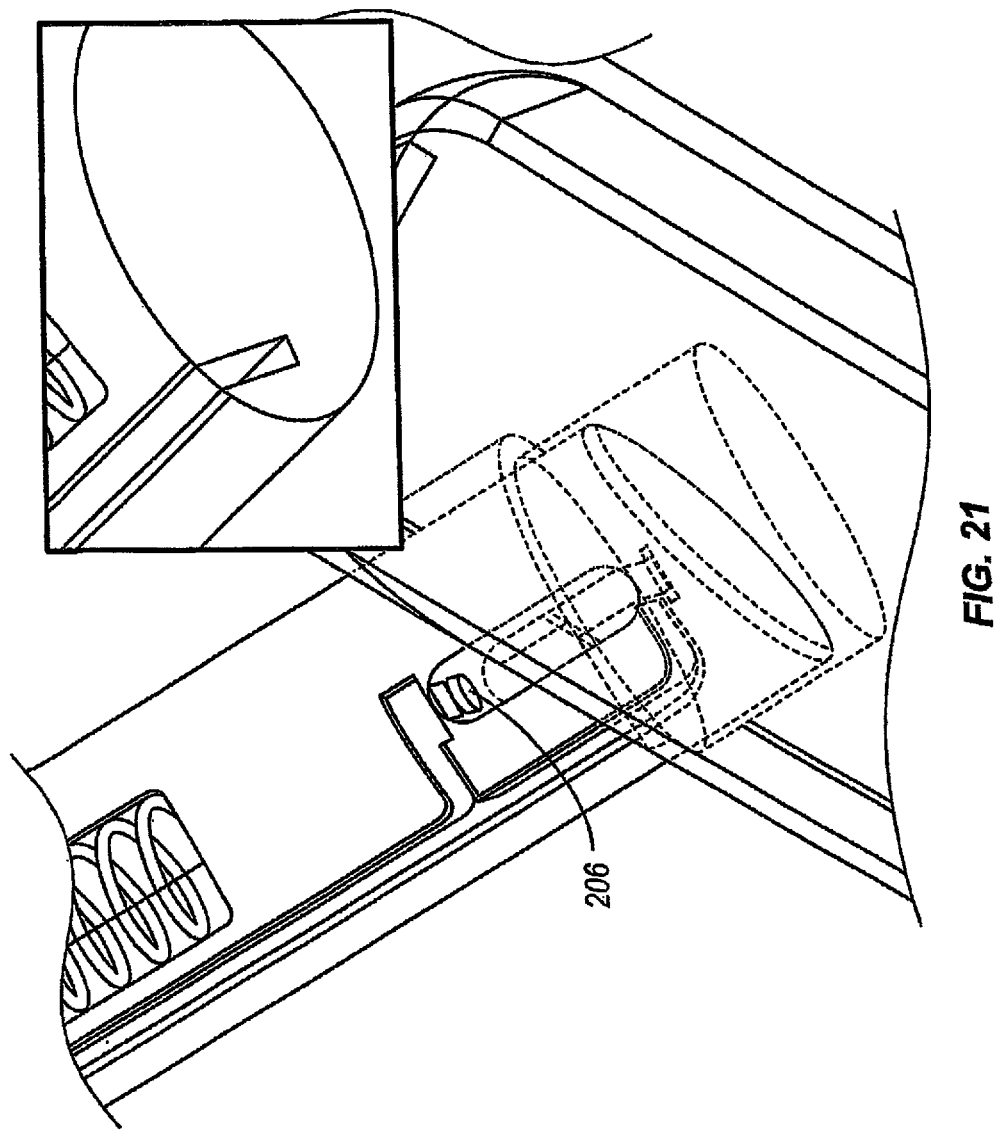
FIG. 21 is a schematic partial view of a latch and latch release mechanism of the stroller of FIG. 17 illustrating various features of the present invention.
Figure 22:
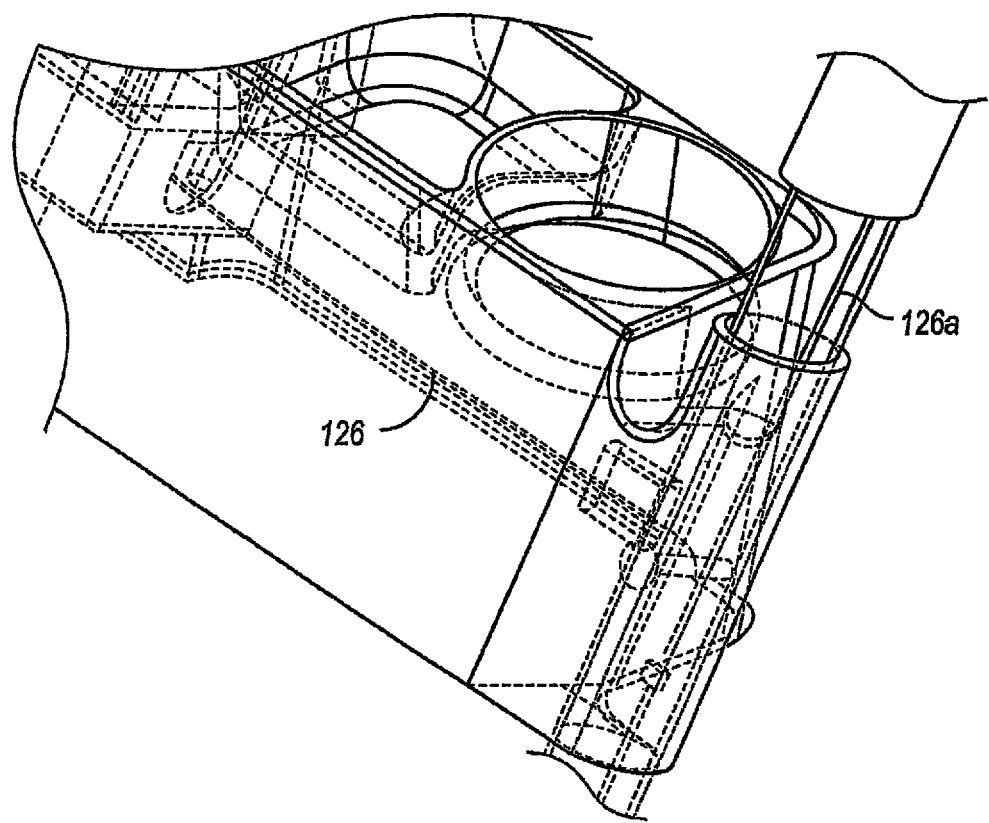
FIG. 22 is a partial isometric schematic view of the preferred latch release mechanism of the stroller of FIG. 17.
Figure 23:
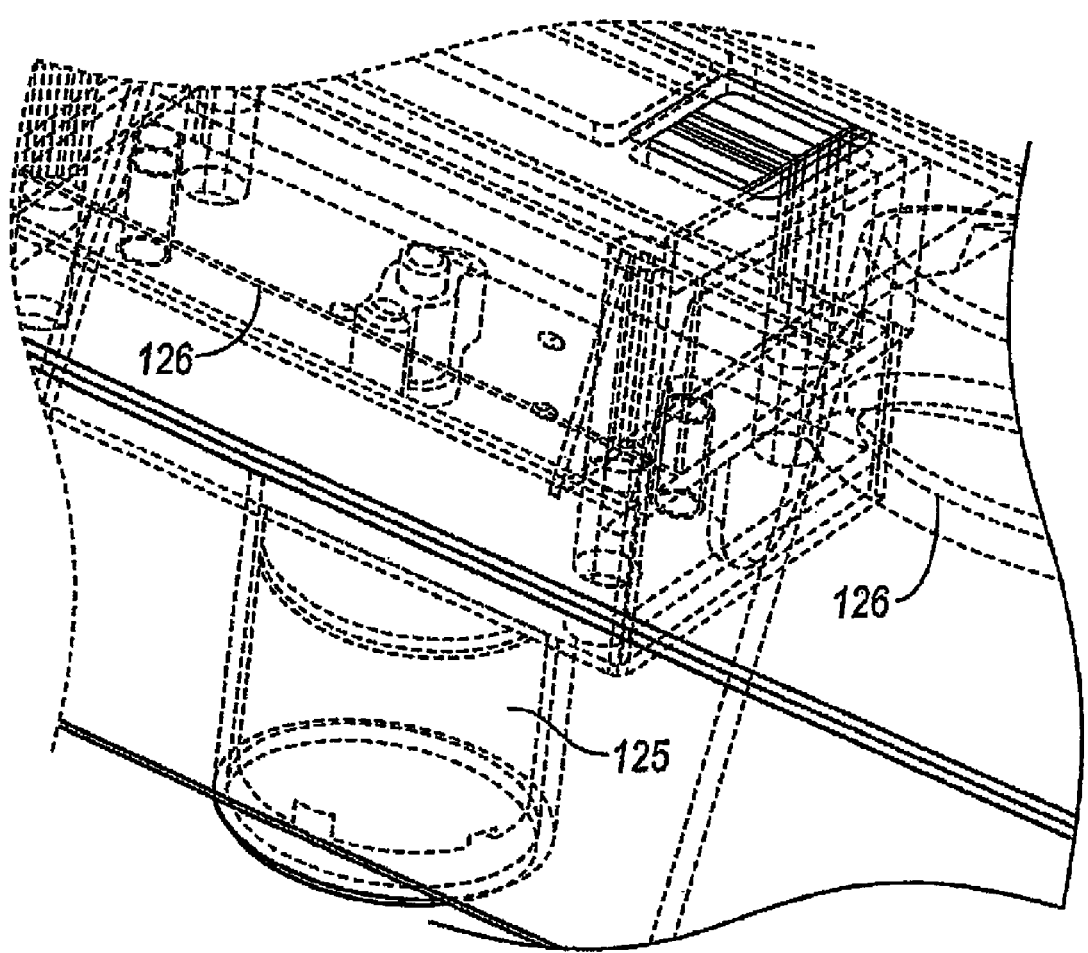
FIG. 23 is a partial isometric schematic view of the preferred latch drive mechanism of the stroller of FIG. 17.
Figure 24:
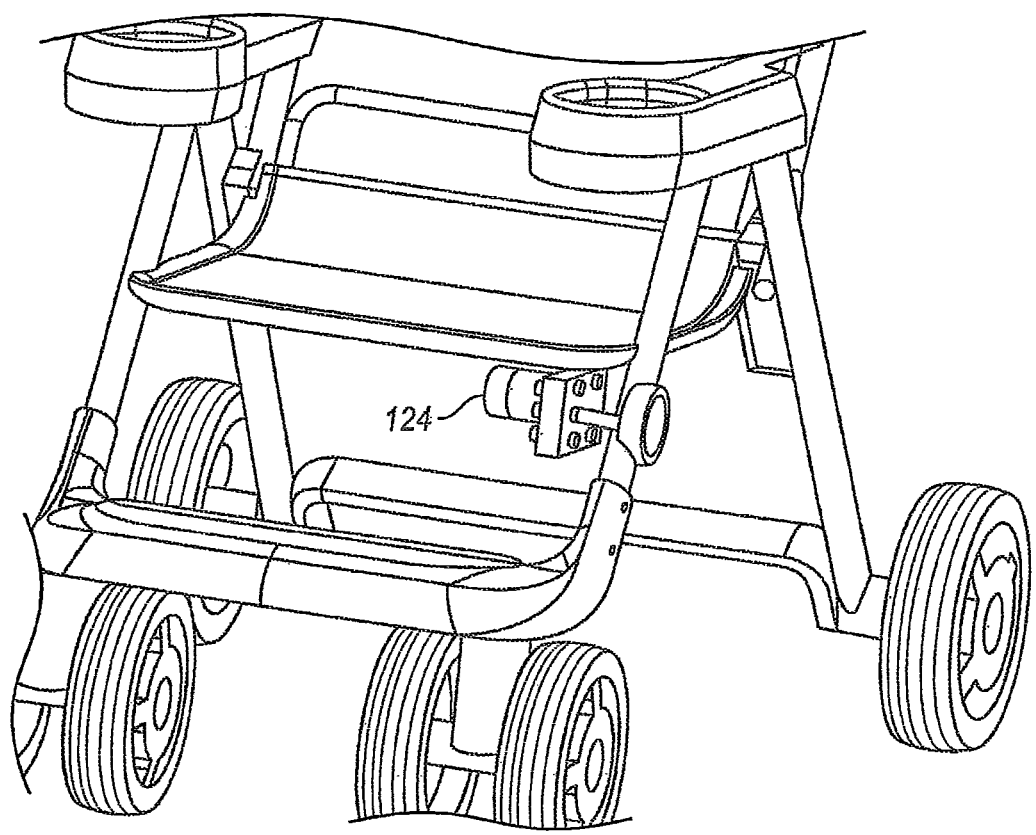
FIG. 24 is a partial isometric view of a stroller embodying various features of the present invention, shown in its fully open position.

With reference to FIGS. 21-23, the stroller 100 may be provided with one or more latches or locking mechanisms (such as in FIG. 21 or any other latches or locking mechanisms) which are moveable between a latched or locked position in which the stroller is prevented from moving out of its open position, and an unlatched or unlocked position in which the stroller is allowed to move freely out of its open position toward its collapsed position. With reference to FIGS. 22 and 23, the latches can be controlled by a small latch release motor 125 disposed in the handlebar 116, a cup holder or the like extending across the handlebar, or another suitable location on the stroller 100, with the shaft of the latch release motor 125 operatively engaged with latch release cables 126 which extend to the latch or locking release mechanisms on either side of the stroller. Upon actuation of the latch release motor, the latch release cables 126 are pulled to release the latch or latches. Separate or, preferably linked, cables 126a also extend to the handlebar 116 to a manual latch cable pulling mechanism (not shown) to allow manual unlatching of the latches, particularly in the event of failure or obstruction of the latch release motor 125. The latch release cables preferably also extend and reside with the components of the stroller and are not exposed or visible.

In accordance with another aspect of the invention, the stroller may be designed so that the releasing of the latches is synchronized with the movement of one or more other components of the stroller to their collapsed positions. This may be done through mechanical linkages or the like, through a suitable controller, both, or in other ways.

A resistance sensing device and/or timer 300 (see FIG. 26) may be operatively connected to the controller to stop movement and/or move toward the unfolded or open position when folding is interrupted, e.g. when too much resistance toward folding movement is encountered or when fully closed position is not achieved within a predetermined time. Alternatively, or additionally, a clutch may be provided between the motor and the elements to which it is connected to provide slippage of the driving force of the motor if too much resistance is encountered.

In accordance with another aspect of the invention, a manual override may be provided to allow manual movement of the stroller between its open and closed positions and/or manual movement of any stroller components between their first and second positions which would normally be carried out automatically by a drive mechanism. Such manual override may be desirable for any of a number of reasons, such as the power source being too low to effect the desired automatic movement or the failure of any parts. A wide variety of manual override mechanism may be utilized in connection with the present invention. For instance, a clutch or clutches may be provided between one or more drive mechanism elements and their associated stroller components for use as a manual override, whereby the clutch may be moved to a position in which it effects disengagement of the drive mechanism. As another example, a mechanical lever or rotary element may be provided at any point in the drive mechanism and/or between the drive mechanism and one or more stroller components associated with the drive mechanism, which is movable between an automatic position (in which a drive mechanism is operatively engaged with one or more stroller components to move the one or more stroller components automatically) and a manual position (in which a drive mechanism is disengaged from its operative engagement with one or more stroller components). For instance, with reference to the drive mechanism 70 of the stroller 10, a disengaging mechanism 83, such as a rotary disengaging element, may be provided which is movable from an automatic position in which the disengaging mechanism 83 allows and/or maintains the operative engagement between the mounting portion 82a of rear nut member 82 (which extends outwardly of the guide rail 16 through the longitudinally extending slot 84 in the guide rail 16) and the rear collar 34 which is mounted to the mounting portion 82a of the rear nut member 82 such that the rear collar 34 and the rear member securing portion 46 connected thereto moves longitudinally along the guide rail 16 together with the rear nut member 82 as the rear threaded member 72 is rotated—and a manual position in which the disengaging mechanism 83 disengages the mounting portion 82a of rear nut member 82 (which extends outwardly of the guide rail 16 through the longitudinally extending slot 84 in the guide rail 16) from the mounting portion 82a of the rear nut member 82 such that the rear collar 34 and the rear member securing portion 46 connected thereto may be moved manually, longitudinally along the guide rail 16 disengaged from the threaded member. Accordingly, when the disengaging mechanism 83 is moved to its manual position, the rear collar may slide freely along the guide rail 16 by manual movement. The same, similar, or other disengaging mechanism may be provided for the front collar to allow the front collar to slide freely along the guide rail when its associated disengaging mechanism is moved to its manual position.

When in its manual position, the disengaging mechanism may engage one or more locking mechanisms when the stroller is moved to its open position and/or closed position to retain the stroller in its open position and/or closed position, such as to prevent the collars from sliding away from their open positions during use and/or away from their closed positions during transport or storage, with the disengaging mechanism being configured such that it does not engage the locking mechanism(s) when in its automatic position (in which the drive mechanism may prevent movement of the stroller away from its open position during use and/or prevent movement of the stroller toward its open position during transport or storage. The locking mechanism(s) may be manually released.

It will be appreciated that the above is merely by way of example, and that a wide variety of disengaging mechanisms may be utilized with a wide variety of different stroller designs, without departing from the inventive concepts of the present invention.

The movement or movements of the inventive strollers of the present invention can be carried out in a wide variety of ways, such as telescoping of components, sliding of components, pivoting of components, rectilinear movement of components, cam driven or guided movement of components, or any other known linkage which allows movement of two or more components relative to one another.

In accordance with one aspect of the present invention, virtually any stroller construction which has one or more front wheels and one or more rear wheels, or having any other wheel configuration such as a circular arrangement of the wheels, left and right wheels, or any other arrangement, in which the stroller has some type of drive for moving at least one of the wheels from a first position to a second position may be constructed. In accordance with another aspect of the invention, virtually any stroller construction can be utilized which allows automatic movement of at least one its wheels from an open position to a collapsed position, or back and forth between collapsed and open positions, or between an extended position and a retracted position. In accordance with another aspect of the invention, a stroller may be provided having a frame with one or more components, which may be wheel components and/or other stroller components or attachments (or components to which attachments may be connected) with a drive operatively connected with the one or more components to move them from a first position to a second position. This may be used for automatic movement of the components between any desired first and second positions. In accordance with another aspect of the invention, one or more stroller components or attachments may be moved between three or more selective positions by the drive mechanism and/or control switches, and or one or more controllers.

In accordance with an aspect of the invention, a controller may be used to control the drive. The controller may actuate the drive mechanism(s) for a predetermined period of time to move the stroller between its fully open and fully collapsed positions, and/or sensor(s) may be used to limit the actuation of the drive mechanism(s) when the component(s) reach and/or approach their fully open and/or fully collapsed positions. The controller and drive may be constructed to allow the drive to move or operate at different speeds or rate of movement over different portions of its movement, which (depending on the stroller construction and operative engagement of the drive with the stroller components) may allow the stroller components to be moved at a constant or approximately constant speed, or may allow the stroller components to be moved at different speeds over different portions of their movement. By way of example, it may be desirable to have one or more stroller components move quickly during their initial movement(s) and more slowly during their final movement(s), or vice-versa.

In accordance with another aspect of the present invention, a stroller may be provided having latch or locking components operatively connected with the drive mechanism, or a separate drive mechanism, which latches are moveable between a locking position which maintains the stroller in its collapsed position and an unlocked position which allows the stroller to move from its collapsed position to it open position.

Backup mechanical systems may be provided to serve as the drive for moving the wheels and/or other stroller components. A mechanical system(s) may use elements common with the automatic system(s), use independent element(s), or both.

As used herein, movement of the stroller between its collapsed and open positions refers to movement of one or more of the stroller components between their collapsed and open positions, and vice-versa.

As used herein, the terms drive and drive mechanism may refer simply to a motor or may refer to a more complex drive system which may be a motor and other components or any other device capable of moving itself and/or other elements. However, the invention is not limited to drives or drive mechanisms having a motor. For instance, but not by way of limitation, the drive or drive mechanism may be a hydraulic or pneumatic drive, with hydraulic or pneumatic tubes extending from a hydraulic or pneumatic pump, internally and/or externally of one or more stroller components, to desired locations of the stroller to effect movement of one or more stroller components. Cables, running internally and/or externally of one or more stroller components, may be utilized. Suitable accommodation for the cables, pneumatic tubing, hydraulic tubing and/or electrical wires is preferably provided to prevent pinching, folding or other deformation which would prevent suitable or optimal operation of these elements. An energy storing drive or drive mechanism (such as one utilizing a spring loaded element, other resilient element or electromagnetic storage element, which stores energy when one or more stroller components are moved from one position to another for subsequent release of part or all of the stored energy to effect movement of the same or other stroller components, may be utilized. Rotary drives and/or drive mechanisms, or non-rotary drives and/or drive mechanisms may be utilized. One type of drive or drive mechanism may be utilized, or any combination of two or more drive mechanisms may be utilized either in combination with one another or individually.

In accordance with an aspect of the invention, the drive or drive mechanism may be located at, or in proximity with, a location (or locations) on the stroller at which one or more stroller components are desired to be moved, or the drive or drive mechanism(s) may be located remote from such location or locations, with suitable operative engagement extending between a remotely located drive or drive mechanism and the location or locations on the stroller at which one or more stroller components are desired to be moved. Such operative engagement may include for instance cables, hydraulic tubes, pneumatic tubes, electromagnetic forces, electric wires, or any of a wide variety of other engagements.

In accordance with another aspect of the present invention, the controller used to control the motor to control the collapsing and opening movements, or other desired stroller component movements, of the strollers of the present invention may be constructed and configured to have two or more discrete switches (not shown) which need to be actuated simultaneously, or in a predetermined sequence or pattern, to effect actuation of the motor and thereby the movable components of the stroller, so as to prevent inadvertent movement of the stroller components, such as inadvertent movement of a stroller toward its deployed and/or collapsed positions. The two or more discrete switches are preferably spaced sufficiently apart from one another, or otherwise disposed relative to one another, so as to prevent inadvertent actuation of one switch upon actuation of the other switch.

The control switch or switches may be constructed to require that one switch, or a combination of switches, be engaged throughout the movement of the desired stroller components, such as during opening and/or folding operations of strollers designed for automatic opening and closing. Alternatively, a suitable control switch or switches, and/or suitable controller, may be provided such that only one actuation of a switch or switches is required to effect the desired movement of two or more stroller components, such as full movement of a stroller between its fully-deployed or open and/or fully-collapsed or folded positions. As a further alternative, a controller may be provided to move the stroller to a position intermediate its fully open and/or fully collapsed position, such as a midway condition, with one actuation of a switch or switches, and further or complete movement of the stroller to its fully deployed and/or fully collapsed positions requiring a subsequent actuation of a switch or switches.

The controller may be constructed to automatically switch directions with each successive actuation. For example, should the movement of the stroller toward the fully-collapsed position be stopped at an intermediate point, such as upon a user noticing a toy in the stroller which is to be removed, but which has been enclosed by the partially-collapsed stroller, the user need only release the switch or switches and reengage them for movement in the opposite direction, toward the fully open position. The motor may then be stopped and re-actuated for movement of the stroller to its fully collapsed position.

The control switch and/or controller may be mounted on the frame of the stroller, such as on the rear wheel support member or elsewhere on the stroller, or alternatively, the control switch and/or controller may be separate from the stroller, such as on a key fob or other portable device, and operated using wireless technology. This may facilitate the ability of a user to hold a child or baby with both hands throughout the opening and/or collapsing of the stroller.

The controller may be configured and constructed utilizing any of a wide variety of known controller designs and/or mechanisms. For instance, the controller may utilize electrical contact switches and/or may utilize a processor, microprocessor or microcontroller.

The controller may operate in conjunction with one or more sensors, such that upon actuation, or lack of actuation, of one or more sensors the motor does not operate even when the one or more switches, or other control actuation mechanism, which would normally actuate the motor, are properly actuated.

The controller may also be provided with switches or other actuators for controlling additional items such as a timer, an alarm clock feature, a music device, a monitor, or any other desirable items. If desired, a general auxiliary device connector may be provided through which various auxiliary devices may be interchangeably connected and controlled by the controller and/or suitable control switch, which devices may be powered by the power source for the stroller, or through an independent power source.

In accordance with another aspect of the invention, the movement of one or more front wheel support structures, one or more rear wheel support structures, and one or more latches may be carried out in a predetermined sequence. This predetermined sequence may be that the one or more latches are moved to their unlatched positions prior to the movement of the other members such as the front and rear wheel support structures, or the predetermined sequence may be that the latches are moved to their unlatched positions simultaneous with the movement of one or more components of the stroller toward their open positions, or any other sequence suitable for the particular stroller design and result to be achieved. A latch may also be provided to move to its locked position to keep the stroller in its collapsed position, which may be part of the predetermined sequence or a separate operation.

In accordance with another aspect of the invention, the power source for driving the motor may be a replaceable and/or rechargeable battery or batteries, conventional battery or batteries, and/or a direct electrical supply such as that available from an electrical outlet. The power source may be permanently attached to the stroller, or may be removable for charging, replacement, or the like. To keep the overall stroller relatively low in weight and/or to keep production costs down, or for other reasons, a relatively small power source may be utilized which has sufficient power to move the stroller back and forth between its deployed and collapsed positions, but which does not have sufficient additional power to regularly or routinely power additional accessories or onboard systems without draining its power undesirably quickly. Alternatively, a larger power source may be utilized which not only has sufficient power to move the stroller back and forth between its open and collapsed conditions, but also has additional capacity to drive one or more additional accessories and/or onboard systems, which accessories and/or onboard systems may be integral with the stroller or may be modular additions or connections to the stroller. In accordance with an aspect of the invention, the stroller may be constructed and configured to recharge, or maintain a predetermined power level of, its onboard power source through a generator which is driven by the turning of the stroller wheels.

In accordance with another aspect of the invention, a display may be utilized in conjunction with the stroller, which display or a portion thereof may be mounted onboard the stroller or be remote, to provide visual and/or audio feedback to the user about any desired feature or parameter, such as the position of the stroller frame, the presence of an object in the stroller, whether the stroller will move toward its open or collapsed condition when next actuated, the presence of a baby or child in the stroller, instructions for use and operation of the stroller, emergency telephone numbers, environmental conditions in which the stroller is being used, or any other desired feature or parameter.

In accordance with yet another aspect of the invention, one or more object sensors 200 (see FIG. 17) may be utilized in conjunction with the stroller, with the object sensor or sensors 200 having the ability to detect the presence of objects within the interior portion of the stroller and to interrupt and/or prevent movement of the stroller in the direction toward its collapsed condition when the object sensor 200 detects the presence of an object within the interior portion of the stroller. The object sensor or sensors 200 may be of any known type, or any type later developed, such as a mechanical weight sensor, a proximity sensor, a motion sensor, or a light beam sensor. The sensor or sensors 200 may be electronic and may send a signal which is electrically acted upon to prevent or interrupt power to the motor, and/or the sensors may be mechanical and actuate a physical lock or a brake to prevent further collapsing or the full collapsing movement of the stroller.

Sensors may also be used to detect the presence of modular add-on devices connected to the stroller, such that movement of the stroller to its collapsed condition is prevented when a connected add-on is detected, thereby preventing potential damage to the add-on device.

Figure 26:
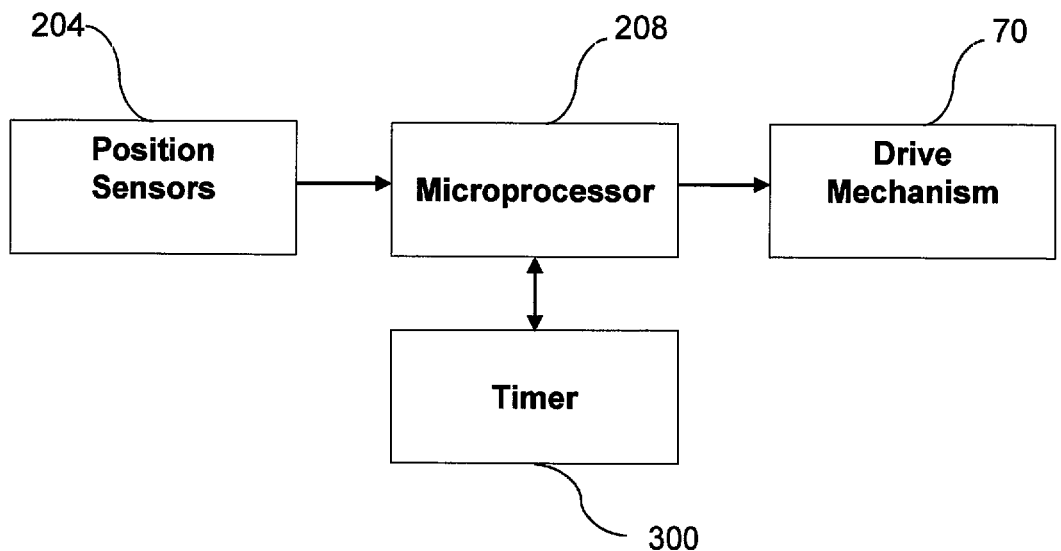
FIG. 26 is a block diagram illustrating the manner in which position sensors may operate in conjunction with electronic timer controls such that a signal to effect stoppage of power to the motor is sent if the position sensor is not engaged within a predetermined time period.

In accordance with still another aspect of the invention, position sensors 204 (see FIG. 17) may be utilized at selective locations on the frame to send a signal indicative of the positions of one or more components or elements of the stroller. The position sensors 204 can be used for several purposes, such as sending a signal to a display to provide a visual and/or audio indication to the user as to the current position or of the deployment or the collapsing of the stroller and/or to provide an interrupting signal (or non-signal) if a position sensor or sensors 204 are not engaged as they would be during proper deployment and/or collapsing of the stroller. Any one or more of several known types of sensors may be utilized, such as rotary encoders at any one or more frame component pivot points, and/or limit or contact switches which are engaged as selective elements of the stroller move to their proper positions, or improper positions, during deployment and/or collapsing of the stroller. By way of example, positions sensors 204 may be mounted to the stroller at positions which provide indication that the stroller has moved to its fully deployed condition, its fully collapsed condition, or any condition in-between; and/or position sensors 204 may be mounted at locations to detect the engagement or lack of engagement of latches. With reference to FIG. 26, position sensors 204 may operate in conjunction with electronic timer controls 300 such that a signal to effect stoppage of power to the motor is sent if the position sensor 204 is not engaged within a predetermined time period.

If a motor is used as the drive mechanism, the motor may be of a reversible type, or alternatively, a single-direction motor with mechanical reversing means.

In accordance with another aspect of the present invention, a stroller may be provided in which the front and/or rear wheels move front to back and/or back to front and/or side to side and/or top to bottom and/or bottom to top. This may apply to other stroller components as well. For instance, a stroller may be provided in which the wheels of the stroller remain on the ground or otherwise relatively stationary, while other stroller components move forwardly and/or rearwardly and/or sideways and/or upwardly and/or downwardly between collapsed and open positions.

The stroller embodiments described in detail above, are simple, robust, easy to use, and relatively inexpensive. The various structures of the apparatus may all be made of any suitable plastics or formed of metals.

From the foregoing, it can be seen that there has been provided features for an improved stroller. While particular embodiments of the present invention have been shown and described in detail, it will be obvious to those skilled in the art that changes and modifications may be made without departing from the invention in its broader aspects. Therefore, the aim is to cover all such changes and modifications as fall within the true spirit and scope of the invention. The matters set forth in the foregoing description and accompanying drawings are offered by way of illustrations only and not as limitations. The actual scope of the invention is to be defined by the subsequent claims when viewed in their proper perspective based on the prior art.

The invention claimed is:

1. A stroller, comprising:
 a first stroller component;
 a second stroller component;
 a drive mechanism operatively engaged with the at least one of the first and second stroller components to move the at least one of the first and second stroller components from a first position to a second position;
 at least one position sensor operably coupled to at least one of the first stroller component, the second stroller component, and the drive mechanism; and
 a microprocessor operably coupled to the at least one position sensor and the drive mechanism,
 wherein the at least one position sensor is configured to send a signal to the microprocessor indicative of the positions of at least one of the first stroller component and the second stroller component, and
 wherein the at least one position sensor operates in conjunction with a timer operably coupled to the microprocessor such that a signal to effect stoppage of power to the drive mechanism is sent by the microprocessor if the at least one position sensor does not send the signal to the microprocessor indicative of the positions of at least one of the first stroller component and the second stroller component within a predetermined period of time.

2. The stroller in accordance with claim 1, wherein the first position is an open position and the second position is a collapsed position.

3. The stroller in accordance with claim 1, wherein the at least one position sensor is a rotary encoder, a limit switch, a contact switch or any combination thereof.

4. The stroller in accordance with claim 1, wherein the at least one position sensor is a rotary encoder positioned at any one or more pivot point of at least one of the first stroller component and the second stroller component.

5. The stroller in accordance with claim 1, wherein the at least one position sensor is a switch that is engaged as at least one of the first stroller component and the second stroller component is moved from the first position to the second position.

6. The stroller in accordance with claim 1, further comprising a frame coupled to at least one of the first stroller component and the second stroller component.

7. The stroller in accordance with claim 6, further comprising an object sensor operationally coupled to the control system and configured to detect the presence of objects within an interior portion of the frame and send a signal to the control system to prevent actuation of the drive mechanism if an object is detected in the interior portion of the frame.

8. The stroller in accordance with claim 1, wherein the at least one position sensor sends a signal to a display to provide at least one of a visual indication and an audio indication to a user as to a current position of at least one of the first stroller component and the second stroller component.

9. The stroller in accordance with claim 1, further comprising one or more latches in operative engagement therewith, which one or more latches are moveable between a latched position in which the one or more latches prevent movement of at least one of the first stroller component and the second stroller component toward their second positions, and an unlatched position in which the one or more latches allow movement of at least one of the first stroller component and the second stroller component toward their second positions, with the one or more latches being movable to their unlatched positions by one or more latch drive mechanisms operatively connected thereto.

10. The stroller in accordance with claim 9, further comprising one or more latch position sensors which detect when the one or more latches are in their latched positions, with the one or more latch position sensors sending a signal to the control system to stop actuation of the one or more latch drive mechanisms upon receipt of the signal.

11. The stroller in accordance with claim 9, further comprising a display and one or more latch position sensors which detect when the one or more latches are in their latched positions, with the one or more latch position sensors sending a signal to the display when the one or more latches are in their latched positions, with the display providing visual confirmation to the user that the one or more latches are in their latched positions.

12. The stroller in accordance with claim 1, further comprising a disengaging mechanism for disengaging the operative engagement between the drive mechanism and the at least one of the first and second stroller components.

13. The stroller in accordance with claim 12, wherein the disengaging mechanism comprises a manual override mechanism which is selectively operable between a first position in which the manual override mechanism effects operative engagement between the drive mechanism and the at least one of the first and second stroller components, and a second position in which the manual override effects disengagement of the operative engagement between the drive mechanism and the at least one of the first and second stroller components to facilitate manual movement of the at least one of the first and second stroller components.

14. A stroller, comprising:
a collapsible carriage frame movable between a collapsed position and an open position;
a drive mechanism operatively engaged with the collapsible carriage frame to move the collapsible carriage frame from the collapsed position to the open position;
at least one position sensor operably coupled to at least one of the collapsible carriage frame and the drive mechanism; and
a microprocessor operably coupled to the at least one position sensor and the drive mechanism,
wherein the at least one position sensor is configured to send a signal to the microprocessor indicative of the positions of the collapsible carriage frame, and
wherein the at least one position sensor operates in conjunction with a timer operably coupled to the microprocessor such that a signal to effect stoppage of power to the drive mechanism is sent by the microprocessor if the at least one position sensor does not send the signal to the microprocessor indicative of the positions of the collapsible carriage frame within a predetermined period of time.

15. The stroller in accordance with claim 14, wherein the drive mechanism is configured to move the collapsible carriage frame from the open position to the collapsed position.

16. The stroller in accordance with claim 14, wherein the at least one position sensor is a rotary encoder, a limit switch, a contact switch or any combination thereof.

17. The stroller in accordance with claim 14, wherein the at least one position sensor sends a signal to a display to provide at least one of a visual indication and an audio indication to a user as to a current position of at least one of the first stroller component and the second stroller component.

* * * * *